United States Patent
Fujimoto et al.

(10) Patent No.: US 6,952,273 B1
(45) Date of Patent: Oct. 4, 2005

(54) IMAGE PROCESSING APPARATUS HAVING AN IMAGE READING UNIT AND A PRINTING UNIT ON ONE SIDE OF A SUBSTRATE

(75) Inventors: Hisayoshi Fujimoto, Kyoto (JP); Hiroaki Onishi, Kyoto (JP); Toshihiko Takakura, Kyoto (JP); Norihiro Imamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/744,161

(22) PCT Filed: Jul. 21, 1999

(86) PCT No.: PCT/JP99/03912

§ 371 (c)(1),
(2), (4) Date: Jan. 22, 2001

(87) PCT Pub. No.: WO00/05873

PCT Pub. Date: Feb. 3, 2000

(30) Foreign Application Priority Data

Jul. 24, 1998 (JP) .................................. 10/209435

(51) Int. Cl.⁷ ............................................ G06F 15/00
(52) U.S. Cl. ........................................ 358/1.1; 358/1.8
(58) Field of Search ..................... 358/1.1, 1.8, 1.12, 358/1.14, 1.15, 472, 1.6, 1.9, 1.18, 448, 400, 358/514; 347/241, 209, 171; 399/144

(56) References Cited

U.S. PATENT DOCUMENTS

| | | | | |
|---|---|---|---|---|
| 4,745,489 A | * | 5/1988 | Kashiwagi et al. | 358/296 |
| RE33,425 E | * | 11/1990 | Nihei | 358/478 |
| 5,495,277 A | * | 2/1996 | Imamura et al. | 347/171 |
| 6,448,995 B1 | * | 9/2002 | Fujimoto et al. | 347/241 |

FOREIGN PATENT DOCUMENTS

| | | | | |
|---|---|---|---|---|
| JP | 61284160 A | 12/1986 | | H04N 1/024 |
| JP | 63-108255 | 5/1988 | | G01N 25/56 |
| JP | 04282952 A | 10/1992 | | H04N 1/024 |
| JP | 6-319013 | 11/1994 | | H04N 1/024 |
| JP | 9-284470 | 10/1997 | | H04N 1/024 |

* cited by examiner

*Primary Examiner*—Gabriel Garcia
(74) *Attorney, Agent, or Firm*—Michael Bednarek; Pillsbury Winthrop Shaw Pittman LLP

(57) ABSTRACT

The image processing apparatus (B) includes an integrated image-reading/writing head (A), platen rollers ($P_1$, $P_2$) for a document and a recording paper, and data processor (7) performing data processing necessary for copying an image on the document. The integrated image-reading/writing head (A), a plurality of light receiving elements (20) and a plurality of printing elements (8) are mounted on the same surface of a substrate (4). If the document (D) and the recording paper (K) are fed in the same direction, when the image on the document is copied, the pixel data outputted for the printing are arranged in the order of first to n-th. If the document (D) and the recording paper (K) are fed in opposite directions to each other, the pixel data outputted for the printing are arranged in the order of n-th to first.

16 Claims, 20 Drawing Sheets

Prior Art

IMAGE PROCESSING APPARATUS HAVING AN IMAGE READING UNIT AND A PRINTING UNIT ON ONE SIDE OF A SUBSTRATE

TECHNICAL FIELD

The present invention relates to an image processing apparatus capable of both reading and printing an image.

BACKGROUND ART

A facsimile machine is an example of an image processing apparatus. The facsimile machine has to have both image reading capability and image printing capability, and further has to be as small as possible.

With this background, there is already a facsimile machine incorporating such a constitution as shown in FIG. 20 as part of the facsimile machine. The illustrated constitution comprises an integrated image-reading/writing head H and two platen rollers $P_1$, $P_2$. The integrated image-reading/writing head H includes a case 1e having an upper opening fitted with a transparent cover 19e. Inside the case 1e, a light source 3e for illuminating a reading line Se provided on the transparent cover 19e, and a lens 5e are provided. The case 1e has a bottom surface mounted with a substrate 4e. The substrate 4e has an upper surface 40 and a back surface 41 respectively mounted with a plurality of light receiving elements 2e and a plurality of heating elements 8e, linearly and longitudinally of the substrate 4e.

In the image processing apparatus with the constitution described above, a document D is contacted onto the transparent cover 19e and fed by the platen roller $P_1$. During this feeding process, the document D is illuminated by the light source 3e. Then, light reflected by the surface of the document D is focused by the lens 5e, forming an image of the document D on the array of the light receiving elements 2e. Each of the light receiving elements 2e outputs read image data of the document line by line. On the other hand, a recording paper K which is thermosensible is contacted onto each of the heating elements 8e and fed by the platen roller $P_2$. During this feeding process, selected ones of the heating elements 8e are heated to print the image in the recording paper K line by line.

According to the above facsimile machine, the overall height of the machine can be smaller than a facsimile machine in which the reading head and the printing head are provided separately. Further, the image on the document D can be copied on the recording paper K if print image data is prepared based on the read data outputted from the light receiving elements 2e, and this print image data is outputted to the heating elements 8e.

However, the above facsimile machine has the following problems.

First, the two platen rollers $P_1$, $P_2$ are disposed so as to sandwich the whole of the integrated image-reading/writing head. Thus, the entire assembly of the integrated image-reading/writing head and the two platen rollers $P_1$, $P_2$ has a large dimension thickness-wise of the integrated image-reading/writing head H. Therefore, the thickness of the facsimile machine as a whole is still large.

Second, when manufacturing the integrated image reading/writing head H, first, the light receiving elements 2e must be mounted on the upper surface 40 of the substrate 4e, and then the substrate 4e must be turned over in order to mount the heating elements 8e on the back surface 41 of the substrate 4e. Further, a wiring pattern relevant to the light receiving elements 2e and another wiring pattern relevant to the heating elements 8e must be formed respectively in the upper surface 40 and the back surface 41 of the substrate 4e. Therefore, productivity in the manufacture of the integrated image reading/writing head H is low.

DISCLOSURE OF THE INVENTION

It is therefore an object of the present invention to provide an image processing apparatus capable of solving or reducing the problems in the prior art and capable of copying the image of the document.

The image processing apparatus provided by a first aspect of the present invention comprises: an integrated image-reading/writing head including a transparent cover, a substrate opposed to and spaced from the transparent cover, a plurality of light receiving elements mounted in a row on the substrate and capable of reading in a main scanning direction an image on a document faced onto the transparent cover whereby outputting line by line read image data containing a first to an n-th pixel data, and a plurality of printing elements mounted in a row generally in parallel to the light receiving elements on the substrate and capable of outputting printing image data onto a recording paper for printing;

a platen roller for the document, facing the transparent cover;

a platen roller for the recording paper, facing the printing elements; and data processing means capable of creating the printing image data containing a first to a n-th printing pixel data respectively corresponding to the first to the n-th pixel data in the read image data; and is characterized by that the light receiving elements and the printing elements are mounted on a same surface of the substrate;

that a feeding direction of the document in a region where the document is faced to the transparent cover and a feeding direction of the recording paper in a region where the recording paper is faced to the printing elements are the same; and that the pixel data outputted for the printing are arranged in the order of first to n-th when the printing image data are outputted by the printing elements onto the recording paper for printing.

According to the image processing apparatus having the constitution described above, the following effects are obtained.

First, the two platen rollers for the document and for the recording paper can be faced directly or indirectly to the corresponding light receiving elements and printing elements provided on the same surface of the substrate of the integrated image-reading/writing head. Thus, differing from the prior art, there is no need for disposing the two platen rollers to sandwich the whole of the integrated image-reading/writing head, and it becomes possible to make the two platen rollers not to overlap thickness-wise of the integrated image-reading/writing head, thereby making the apparatus as a whole thinner than before.

Second, when manufacturing the integrated image-reading/writing head, the light receiving elements and the printing elements should be mounted merely on one same surface of the substrate. Therefore, there is no need to turn over the substrate in order to mount these components. Further, the wiring patterns for these light receiving elements and the printing elements can be formed on the same surface of the substrate. Therefore, it becomes possible to increase productivity in the manufacture of the integrated image-reading/writing head, and productivity in the manufacture of the image processing apparatus incorporating the integrated image-reading/writing head than in the prior art.

Third, when creating printing image data based on the read image data obtained by reading the image on the document, and outputting the printing image data onto the recording paper for printing, i.e. when copying the document, the copying operation can be performed appropriately. More specifically, when copying the document, the output is made in such a way that pixel data contained in the printing image data are lined up in the order of first to n-th in the main scanning direction. The order of the pixel data outputted as described is the same as the order of the first to the n-th pixel data in the original read image data when the document is read in the main scanning direction. On the other hand, the feeding direction of the document in the region where the document is faced to the transparent cover and the feeding direction of the recording paper in the region where the recording paper is faced to the printing elements are the same. Therefore, the image printed on the recording paper is not an inverted image of the document.

According to a preferred embodiment of the present invention, the integrated image-reading/writing head is provided with a drive controlling circuit including a shift register serially storing the pixel data contained in the printing image data received from the data processing means in the order of reception and in the direction of the row of printing elements, and selectively driving the printing elements corresponding to contents of the pixel data stored in the shift register. Further, the inputting direction of the printing image data to the shift register is opposite to the main scanning direction.

With the above arrangement, when the printing image data containing the pixel data arranged in the order of first to n-th are sent from the data processing means to the shift register, the pixel data are serially stored in the order of first to n-th in the main scanning direction. This is because the shift register is a storing device in which data storage is made by sequentially shifting the data longitudinally of the shift register so that the datum received first is stored at the farthest location, and according to the above described arrangement, inputting of the data to the shift register is made from the direction opposite to the main scanning direction. For this reason, when the printing elements are driven corresponding to the content of the pixel data stored in the shift register, the pixel data contained in the printing image data are outputted for printing on the recording paper in the order of first to n-th in the main scanning direction. As a result, the image printed on the recording paper is not an inverted image of the document.

The image processing apparatus provided by a second aspect of the present invention comprises:

an integrated image-reading/writing head including a transparent cover, a substrate opposed to and spaced from the transparent cover, a plurality of light receiving elements mounted in a row on the substrate and capable of reading in a main scanning direction an image on a document faced onto the transparent cover whereby outputting line by line read image data containing a first to an n-th pixel data, and a plurality of printing elements mounted in a row generally in parallel to the light receiving elements on the substrate and capable of outputting printing image data onto a recording paper for printing;

a platen roller for the document, facing the transparent cover;

a platen roller for the recording paper, facing the printing elements; and data processing means capable of creating the printing image data containing a first to a n-th printing pixel data respectively corresponding to the first to the n-th pixel data in the read image data; and characterized by that the light receiving elements and the printing elements are mounted on a same surface of the substrate;

that a feeding direction of the document in a region where the document is faced to the transparent cover and a feeding direction of the recording paper in a region where the recording paper is faced to the printing elements are opposite to each other; and that the pixel data outputted for the printing are arranged in the order of n-th to first when the printing image data are outputted by the printing elements onto the recording paper for printing.

According to the image processing apparatus having the above constitution, the same effect as obtained in the image processing apparatus provided by the first aspect of the present invention can be obtained. The image processing apparatus provided by the second aspect of the present invention differs from the image processing apparatus provided by the first aspect of the present invention in relationship between the feeding direction of the document and the feeding direction of the recording paper, and in the order of the pixel data when the printing image data are outputted onto the recording paper for printing. However, with this constitution, it is also possible to copy a document appropriately. Specifically, when copying a document, the output to the recording paper is made in such a way that pixel data contained in the printing image data are lined up in the order of n-th to first in the main scanning direction. The order of the pixel data outputted as described is the opposite, i.e. from first to n-th, to the order of the pixel data in the original read image data when the document is read in the main scanning direction. However, the feeding direction of the document in the region where the document is faced to the transparent cover and the feeding direction of the recording paper in the region where the recording paper is faced to the printing elements are opposite to each other. Therefore, the image printed on the recording paper is not an inverted image of the document.

According to the preferred embodiment of the present invention, the integrated image-reading/writing head is provided with a drive controlling circuit including a shift register serially storing the pixel data contained in the printing image data received from the data processing means in the order of reception and in the direction of the row of printing elements, and selectively driving the printing elements corresponding to contents of the pixel data stored in the shift register. Further, the inputting direction of the printing image data to the shift register is the main scanning direction.

According to the above arrangement, when the printing image data containing the pixel data arranged in the order of first to n-th are sent from the data processing means to the shift register, the pixel data are serially stored in the order of n-th to first in the main scanning direction. For this reason, when the printing elements are driven corresponding to the content of the pixel data stored in the shift register, the pixel data contained in the printing image data are outputted for printing on the recording paper in the order of n-th to first in the main scanning direction. As a result, the image printed on the recording paper is not an inverted image of the document.

According to another preferred embodiment of the present invention, the drive controlling circuit is constituted by using a plurality of IC chips each incorporating a circuit as a unit of the drive controlling circuit. Further, the IC chips are mounted on the surface of the substrate mounted with the light receiving elements and the printing elements.

With the above arrangement, the drive controlling circuit can be built easily by using the IC chips. Further, when mounting these IC chips on the substrate, there is no need for turning the substrate over, and the mounting operation can be performed easily.

According to still another embodiment of the present invention, the drive controlling circuit incorporates a circuit as a unit of the drive controlling circuit, and the IC chips also incorporates the light receiving elements.

With the above arrangement, mounting operation of each of the drive controlling circuit and the light receiving elements is simplified, making possible to further increase productivity in the manufacture of the integrated image-reading/writing head and the image processing apparatus incorporating the integrated image-reading/writing head.

According to still another embodiment of the present invention, the drive controlling circuit is arranged to perform drive control of the printing elements when receiving a strobe signal from the data processing means, and the light receiving elements is arranged to perform reading of the document only while the strobe signal is outputted from the data processing means.

With the above arrangement, it becomes possible that ON-OFF switching of the strobe signal is not made while the light receiving elements are reading the image. Therefore, noise caused by the ON-OFF switching of the strobe signal can be prevented from mixing into the read image data. Thus, quality of the read image can be increased.

According to still another preferred embodiment of the present invention, the integrated image-reading/writing head is provided with a case fitted with the transparent cover, the case is assembled to the substrate to enclose the light receiving elements, allowing part of the substrate to extend out of the case, and the printing elements is mounted on the extended part of the substrate.

With the above arrangement, the light receiving elements can be appropriately enclosed by the case while appropriately reserving space on a side of the case for facing the platen roller for the recording paper onto the printing elements.

According to still another preferred embodiment of the present invention, the surface of the substrate mounted with the light receiving elements and the printing elements is mounted with a light source for illumination of the document.

With the above arrangement, operation of assembling the light source into the integrated image-reading/writing head can be simplified.

According to still another preferred embodiment of the present invention, the printing elements are heating elements. With the above arrangement, it becomes possible to print by means of a thermal-transfer method or a thermosensible method.

Other characteristics and advantages of the present invention will become clearer from the description of the preferred embodiments hereinafter.

BEST MODE FOR CARRYING OUT THE INVENTION

Hereinafter, embodiments of the present invention will be described with reference to the attached drawings.

FIG. 1 ~FIG. 8 show a first embodiment of the present invention. As clearly shown in FIG. 1, an image processing apparatus B according to the present embodiment comprises an integrated image-reading/writing head A, a platen roller $P_1$ for feeding a document D, a platen roller $P_2$ for feeding a recording paper K, and a data processing circuit 7. All of these components are incorporated within a box 9. The recording paper K is a long ribbon of thermosensible paper unwounded from a roll R. Alternatively however, according to the present invention, the recording paper K may be a cut sheet of paper.

Figure 3:
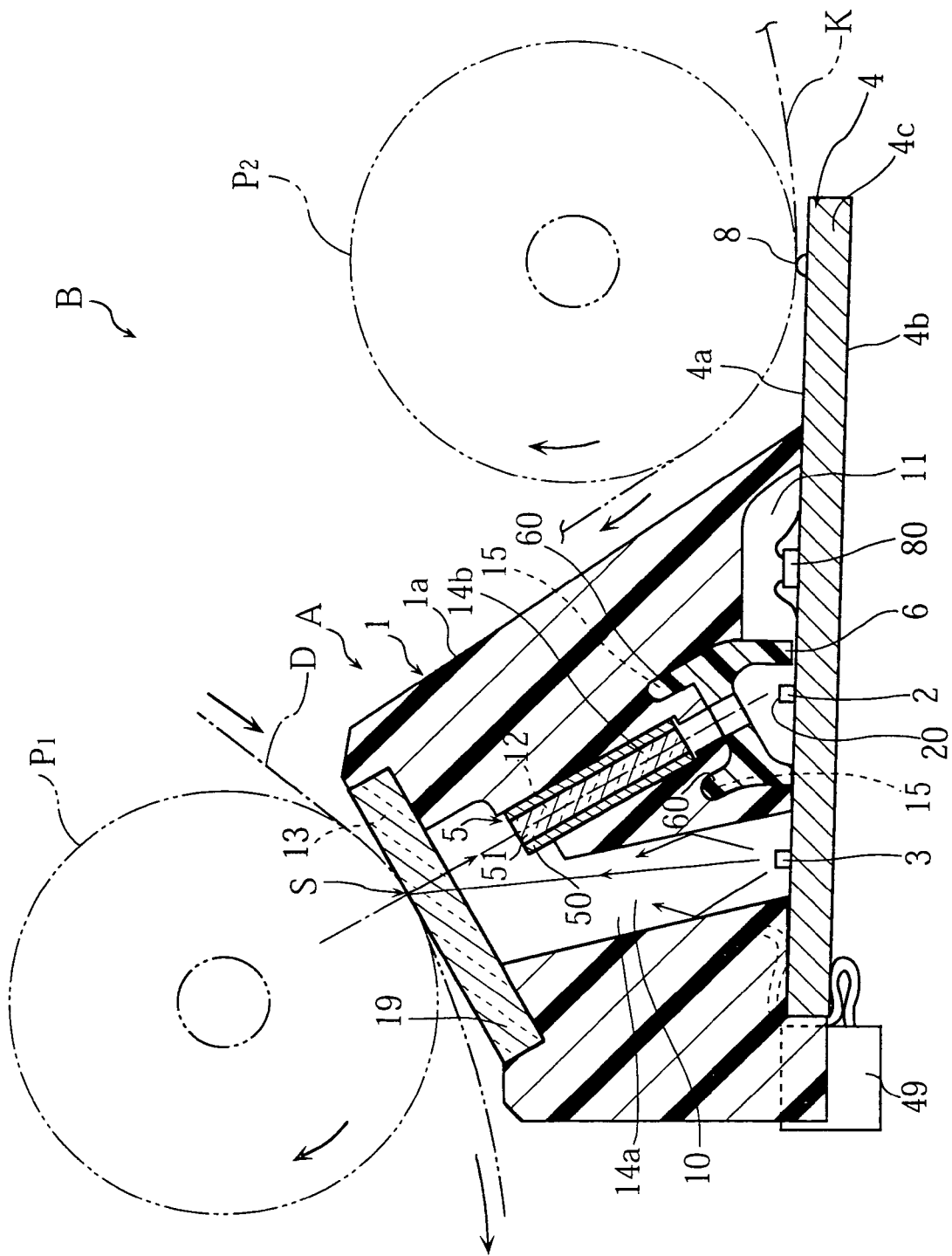
FIG. 3 is a sectional view taken in lines III—III in FIG. 2.
Figure 4:
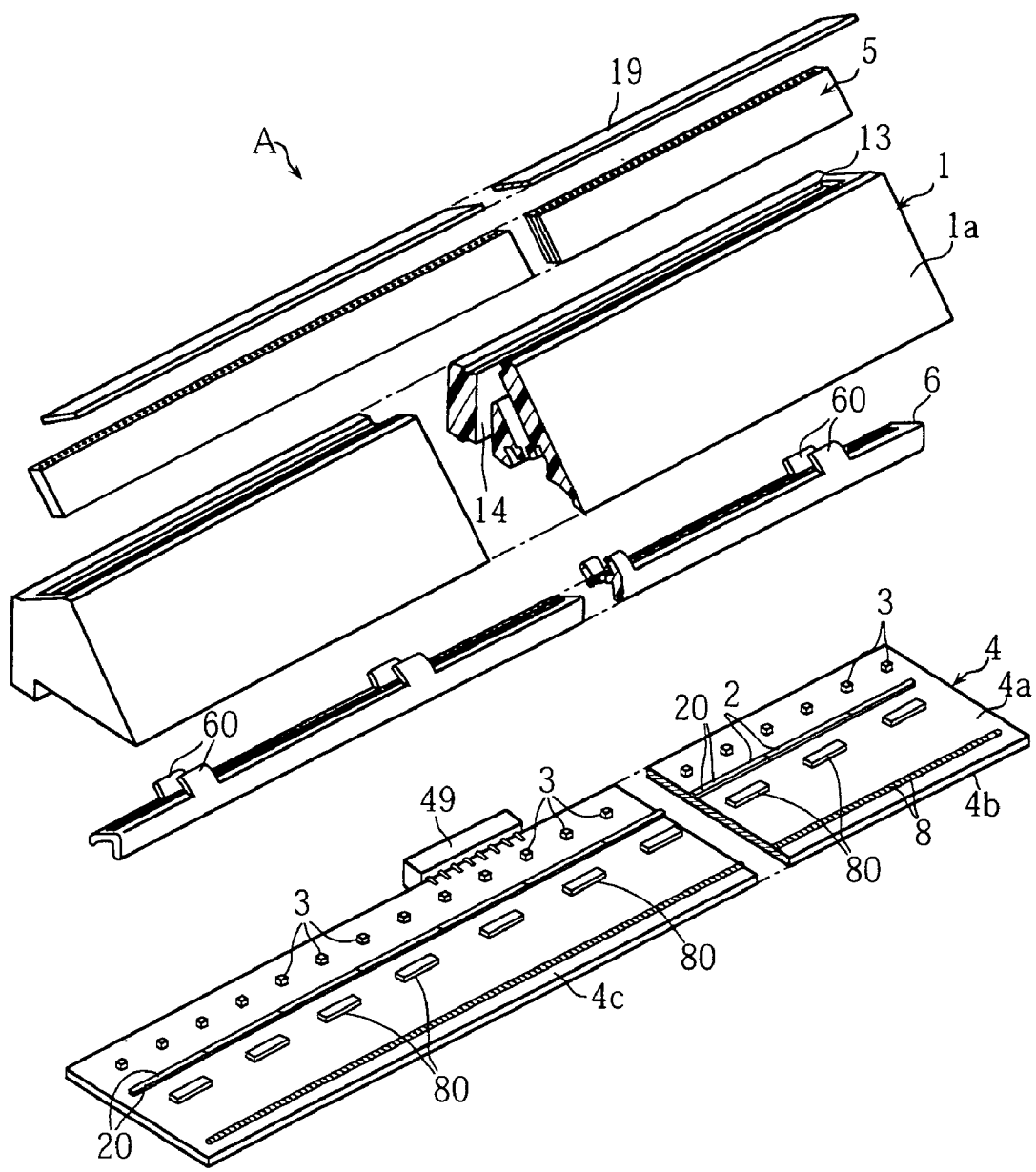
FIG. 4 is an exploded perspective view of the integrated image-reading/writing head in FIG. 2.

As clearly shown in FIG. 3 and FIG. 4, the integrated image-reading/writing head A includes a case 1, a transparent cover 19, a lens array 5, and a substrate 4.

The substrate 4 is made of a ceramic for example, and is formed into an oblong rectangular plate. The substrate 4 has an upper surface 4a mounted with a plurality of light sources 3, a plurality of sensor IC chips 2, a plurality of drive IC chips 80, and a plurality of heating elements 8.

The light sources 3 are provided by an LED chip for example, and mounted linearly and longitudinally of the substrate 4 at an appropriate interval. Each of the sensor chips 2 is provided by a semiconductor chip including an integrally formed plurality of light receiving elements 20 and mounted linearly and longitudinally of the substrate 4. Each of the sensor IC chips 2 is so arranged that when the light receiving elements receive light, read image signal (read image data) having a level corresponding to an amount of the light received is outputted, and transmitted to the data processing circuit 7. Specific details about the circuitry in each of the sensor IC chips 2 will be described later.

The heating elements 8 are an example of the printing elements according to the present invention. The heating elements 8 can be formed by electrically dividing a heating resistor extending longitudinally of the substrate 4. Specifically, the heating resistor can be formed for example by printing and baking a thick film of resistor paste including an electrically conducting component such as ruthenium oxide. Then, a wiring pattern which electrically divides the heating resistor at a predetermined interval longitudinally of the heating resistor is formed. Each of the drive IC chips 80 incorporates circuitry for heating a plurality of the heating elements 8, and mounted in a row longitudinally of the substrate 4 at an appropriate interval. Specific details about the circuitry in each of the drive IC chips 80 will be described later.

The upper surface 4a of the substrate 4 is formed with wiring patterns (not illustrated) respectively related to the light sources 3, the sensor IC chips 2, the drive IC chips 80 and the heating elements 8. Further, one or more connectors electrically connected with the wiring patterns are provided at an appropriate location(s) of the substrate 4. The connector mutually connects the above described electronic components mounted on the substrate 4 and the data processing circuit 7, making possible to supply power to each of the above described components as well as to input and output various signals.

The back surface 4b of the substrate 4 may be provided with a heat radiating plate (not illustrated) made of a metal having a high thermal conductivity. This arrangement allows to release heat generated by the heating elements 8 and the light sources 3 from the substrate 4 via the radiating plate, making possible to stabilize the temperature of the heating elements 8.

The case 1 is made of a whity synthetic resin material such as polycarbonate containing titanium oxide, and has a length generally the same as of the substrate 4. As clearly shown in FIG. 3, the case 1 is assembled to the upper surface 4a of the substrate 4, surrounding each of the light sources 3, the sensor IC chips 2 and the drive IC chips 80. The case 1 is formed with a thickness-wise through hole 10, and a bottom surface formed with a recess 11. The light sources 3 are disposed on the bottom surface within the through hole 10. the sensor IC chips 2 and the drive IC chips 80 are disposed in the recess 11. The substrate 4 has an edge portion 4c extended out onto one side of the case 1. The heating elements 8 are mounted on this extended portion. The case 1 has a side surface 1a rising from the extended portion of the substrate 4. The side surface 1a is slanted to be farther away from the heating elements 8 at a higher elevation of the case 1.

The transparent cover 19 is to guide the document D, and is formed as a plate of transparent glass or synthetic resin. The transparent resin 19 is opposed to and spaced from the substrate 4, and is fitted into a recess 13 provided in the upper surface of the case 1. The transparent cove 19 is slanted to the substrate 4, so that the distance to the substrate 4 increases toward the edge portion 4c of the substrate 4. This is for a purpose of reserving a space between the two platen rollers $P_1$, $P_2$ without increasing a space between the platen roller $P_1$ and the substrate 4. The present invention is not limited by this arrangement however. For example, the transparent cover 19 and the substrate 4 may be in parallel to each other.

The lens array 5 includes a plurality of rod lenses 51 held in a row by an oblong, narrow, block-like lens holder 50. The lens array 5 is fitted into a groove 12 of the case 1, thereby faced toward the back surface of the transparent cover 19. The upper surface of the transparent cover 19 includes an image reading line S in a region facing the lens array 5. The reading line S extends longitudinally of the transparent cover 19. Each of the rod lenses 51 focuses light from the image reading line S onto the array of the light receiving elements 20, forming a line of image of the document D on the light receiving elements 20 without magnification nor inversion. According to the present invention however, the rod lenses may be substituted by other lenses of a different type.

Inside the case 1, a first light path 14a and a second light path 14b are provided. The first light path 14a is provided by the through hole 10, for introducing the light emitted by the light sources 3 to the image reading line S. The second light path 14b includes the groove 12, and is a path for introducing the light reflected from the image reading line S onto the light receiving elements 20 via the lens array 5. As has been mentioned, the case 1 is formed of a white synthetic resin, and therefore the case 1 is entirely white, having a high reflectance. Thus, the light from the light sources 3 can be guided to the image reading line S, while being reflected at a high rate by the white walls along the first light path 14a, making possible to increase radiation efficiency of the light to the image reading line S.

The case 1 has a bottom portion fitted by an assisting member 6 surrounding the sensor IC chips 2. The assisting member 6 is made for example of an ABS resin containing a black pigment, which colors the surfaces in black, to have a high rate of light absorption. With such an arrangement as above, possibility that the light reflects irregularly around the light receiving elements 20 can be eliminated and therefore, quality of the read image can be increased. The assisting member 6 has an upper portion formed with projections 60, which are fitted into corresponding recesses 15 formed in the case 1, thereby assembling the assisting member to the case 1.

Figure 6:
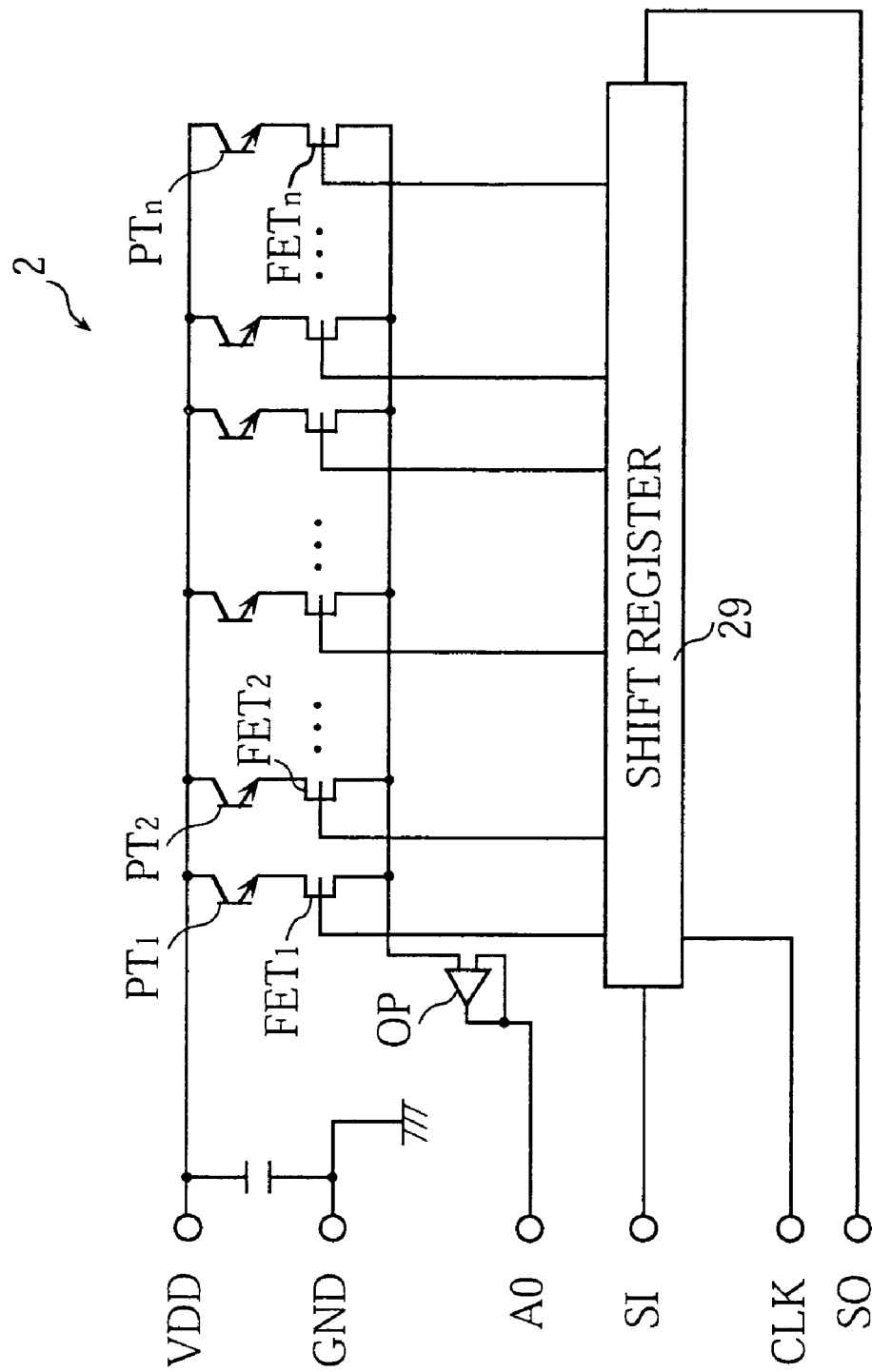
FIG. 6 is a circuit block diagram of a circuit constituted by a plurality of sensor IC chips of the integrated image-reading/writing head in FIG. 2.

FIG. 6 shows a specific constitution of the sensor IC chips 20. It should be noted however, that this figure conceptually shows a case in which a plurality of sensor IC chips 2 are connected in series into one circuit. This particular circuit includes a plurality of phototransistors $PT_1 \sim PT_n$ which provides the plurality (n) of the light receiving elements 2, the plurality of $FET_1 \sim FET_n$ respectively connected to the emitter side of the phototransistors $PT_1$~$PT_n$, an amplifier OP for amplifying the electric current from the $FET_1$~$FET_n$, an n-bit shift register 29, a pad VDD, a pad GND, a pad AO, a pad SI, a pad CLK, and a pad SO. The pad VDD is supplied with power voltage of 5 V for example. The pad GND is grounded. The pad CLK is supplied with a clock signal of 8 MHz for example. If the document D to be read is of the size A4 and the reading is made at a reading density of 8 dots/mm for example, a total of 1728 light receiving elements 20 must be disposed. Therefore, if a total of 96 light receiving elements 20 is formed in each of the sensor IC chips 2, a total of 18 sensor IC chips 2 are mounted linearly on the substrate 4, and these 18 sensor IC chips 2 are electrically connected in series.

According to the above circuit, when a serial-in signal is inputted to the pad SI first, the shift register 29 sequentially turns on the $FET_1$ ~$FET_n$ in a predetermined direction (main scanning direction) based on the clock signal. Then, electric charges corresponding to the amount of the light received and stored in the phototransistors $PT_1$~$PT_n$ are discharged sequentially in a predetermined order, amplified by the amplifier OP, and then serially outputted to the pad AO. This output signal is an analog signal and is a signal including the read image data according to the present invention. When the electric charges have been discharged from the last phototransistor $PT_n$ in the operation of the shift register 29, a serial-out signal is outputted to the pad SO. The circuit can repeatedly perform the above described cycle of operations, in which the read image data is outputted line byline. One photo transistor corresponds to one reading pixel. Therefore, the above one line of read image data contains the same number of pixel data as the number of the light receiving elements 20, i.e. the first pixel datum to the n-th pixel datum. The read image data serially outputted to the pad AO is transmitted to the data processing circuit 7.

Figure 1:
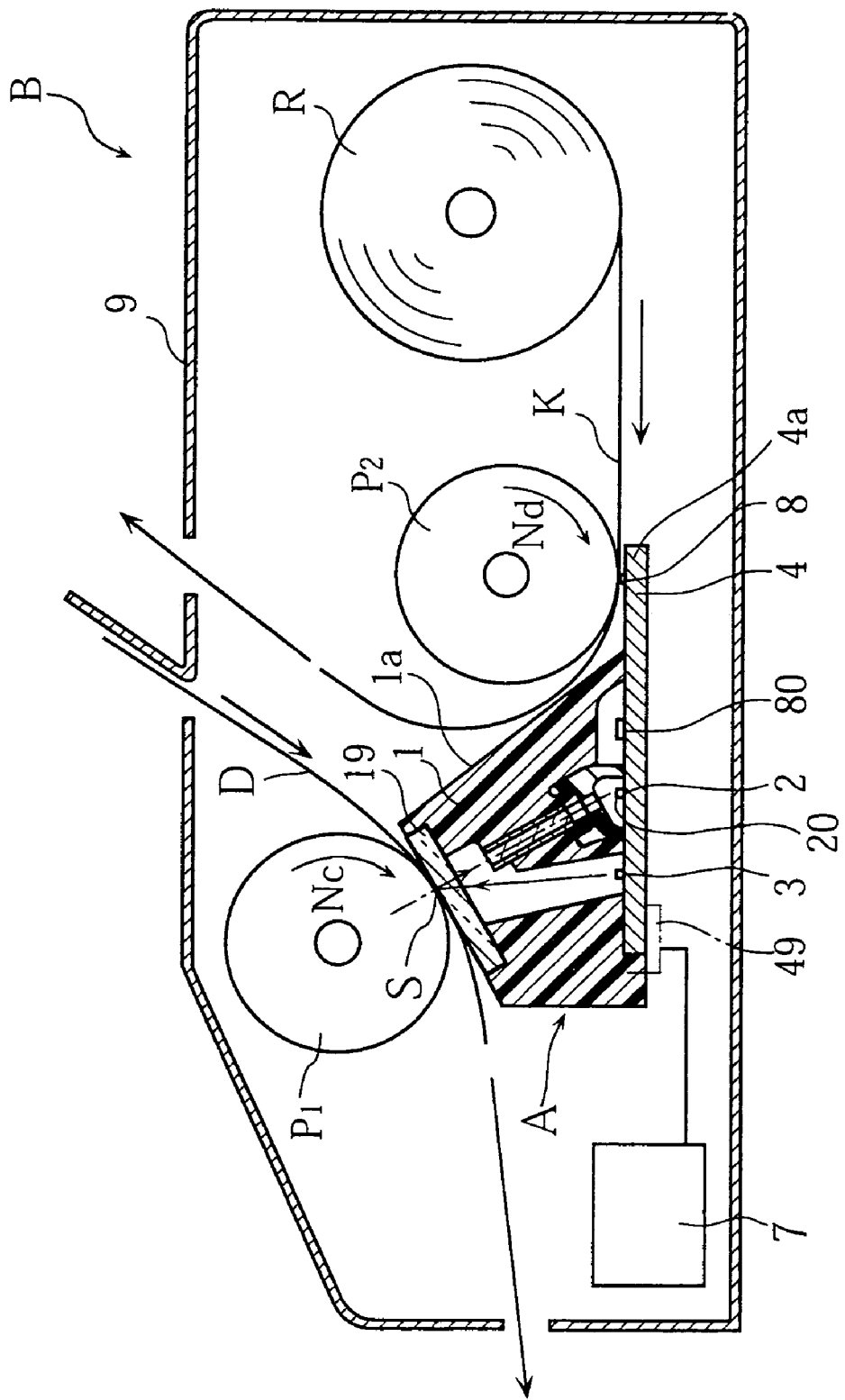
FIG. 1 is a simplified sectional view of a first embodiment of the image processing apparatus according to the present invention.
Figure 2:
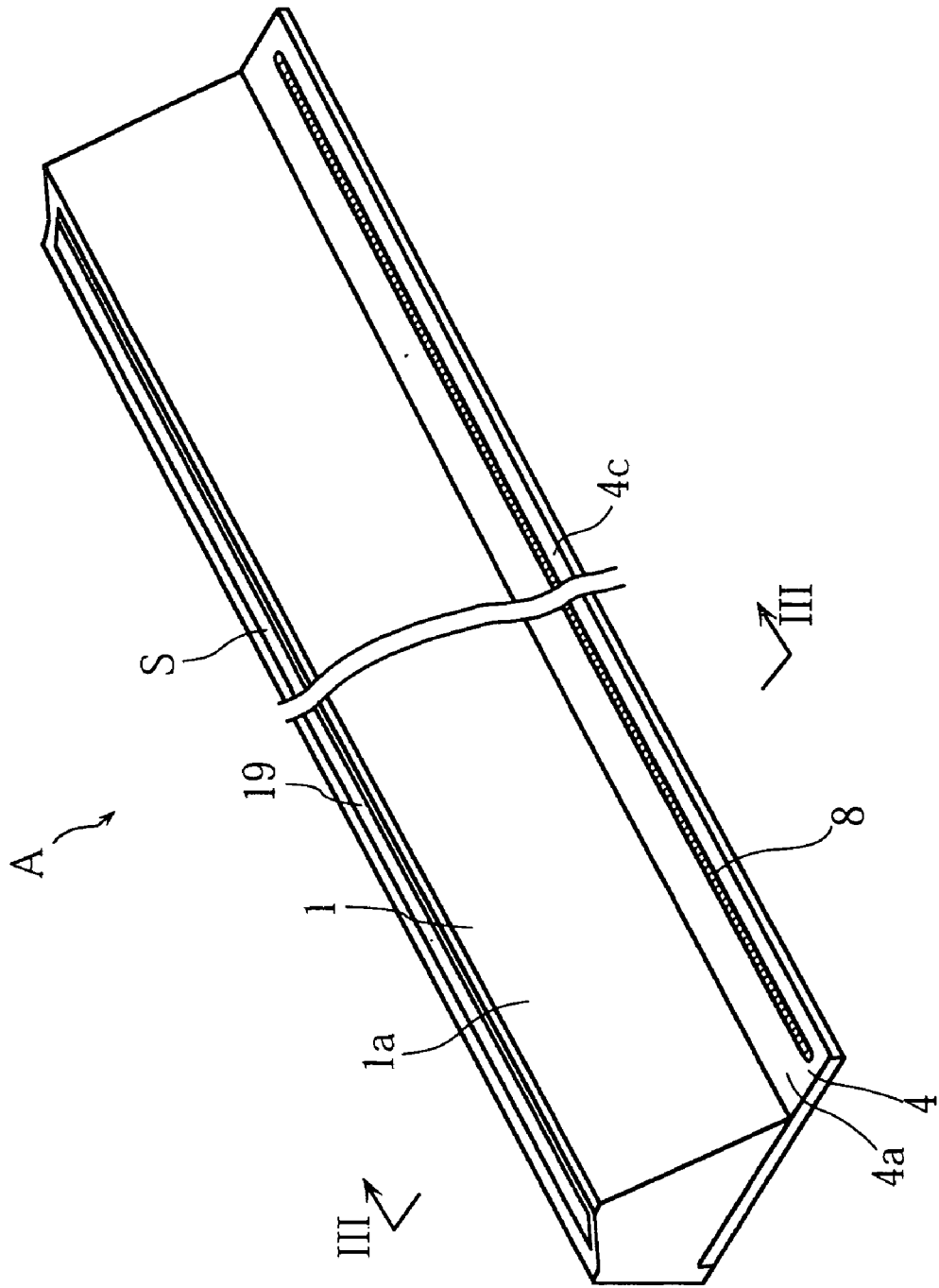
FIG. 2 is a perspective view of an integrated image-reading/writing head used in the image processing apparatus in FIG. 1.

Referring to FIG. 1, the data processing circuit 7 corresponds to the data processing means according to the present invention, and includes for example, a CPU and accompanying memories, or a circuit to convert image data into binary values. The data processing circuit 7 is not only capable of processing the image data but also capable of controlling the reading operation of the image on the document D by using the light receiving elements 20, and outputting of the image data for printing on the recording paper K. The data processing circuit 7 also performs transmission of various signals mentioned above. Further, the data processing circuit 7 performs transmission of various signals to the drive IC chips 80 as will be described later. As part of the data processing function, the data processing circuit 7 creates printing image data, i.e. data for printing an image, based on the read image data outputted from the pad SO of the sensor IC chips 2, and send the printing image data to the drive IC chips 80.

Figure 7:
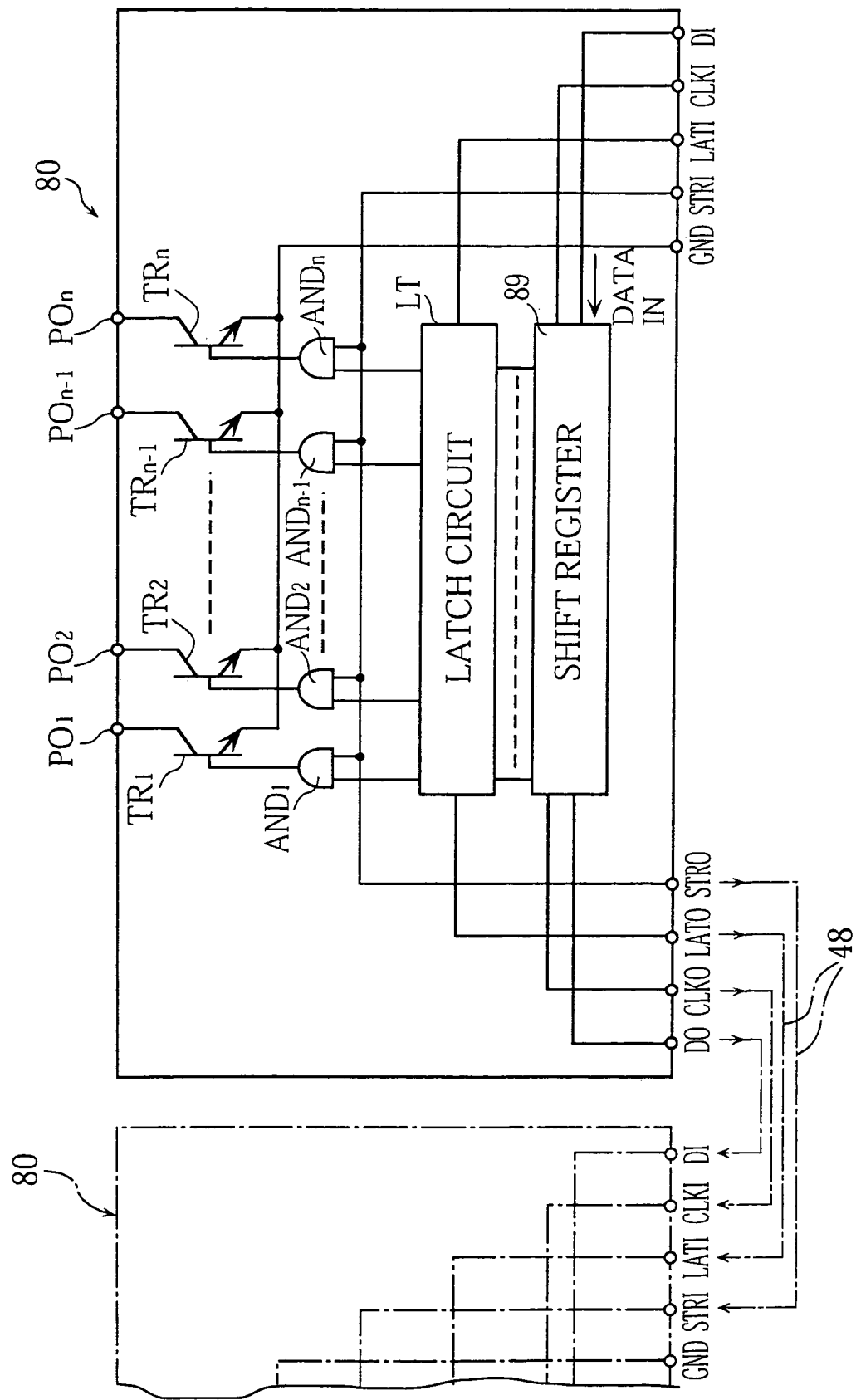
FIG. 7 is a circuit block diagram of a plurality of drive IC chips of the integrated image-reading/writing head in FIG. 2.

As clearly shown in FIG. 7, each of the drive IC chips 80 includes a shift register 89, a latch circuit LT, a plurality (n) of AND circuits $AND_1$~$AND_n$, the plurality of bipolar transistors $TR_1$~$TR_n$, the plurality of pads $PO_1$ ~$PO_n$, and various other pads. It should be noted here that the number of bits "n" of the circuitry built in one drive IC chip 80 has a different value from the number of bits "n" of the circuit as a whole shown in FIG. 6. The pads $PO_1$ ~$PO_n$ are electrically connected with the heating elements 8. For example, if recording is made on the recording paper K of the width of size A4 at a printing density of 8 dots/mm, a total of 1728 heating elements 8 must be disposed. Therefore, if each of the drive IC chips 80 incorporates a total of 144 pads $PO_1$ ~$PO_n$ and the same number of bipolar transistors $TR_1$ ~$TR_n$, a total of twelve drive IC chips 80 are mounted in a row generally in parallel to the heating elements 8 (See FIG. 5.). The pads $PO_1$~$PO_n$ are respectively connected with the heating elements 8 via a wiring portion 47. The drive IC chips 80 are electrically connected in series via a pattern-formed wiring portion 48.

Electrical connection between a pair of mutually adjacent IC chips 80 is as shown in FIG. 7. Specifically, the pad STRO, the pad LATO, the pad CLKO, and the pad DO of one IC chip 80 are connected with the pad STRI, the pad LATI, the pad CLKI, and the pad DI of the other IC chip 80 respectively. Each of the strobe signal sent to the pad STRI, the latch signal sent to the pad LATI, the clock signal sent to the pad CLKI, and the printing image data sent to the pad DI of said one drive IC chip 80 can be transferable to said other drive IC chip 80. The pad GND is grounded individually for each drive IC chip 80.

The shift registers 89 incorporated respectively in the drive IC chips 80 are connected in series. The shift registers 89 can store printing image data for one line (for example, image data containing 1728 bits of binary pixel data) sent to the pad DI from the data processing circuit 7, serially in the order of transmission from the data processing circuit 7. More specifically, as clearly shown in FIG. 5, the printing image data for one line is inputted in the direction indicated by Arrow Na, i.e. from a right end 89b toward a left end 89a of the array of shift registers 89, and stored. This direction of input of the printing image data is the opposite of the main scanning direction Nb of the light receiving elements 20. The main scanning direction Nb according to the present embodiment is the direction, as in FIG. 5, from a left end 20a toward a right end 20b of the array of the light receiving elements 20.

As shown in FIG. 7, the image data stored in each of the shift registers 89 is then latched in the latch circuit LT. Under this state, when the strobe signal is sent from the data processing circuit 7 to the pad STRI, one of the input ends in each of the AND circuits $AND_1$~$AND_n$ assumes the high level. On the other hand, the other input end in each of the AND circuits $AND_1$~$AND_n$ assumes either one state of the high level and the low level depending on the content of the printing image data latched in the latch circuit LT. If this other input end assumes the high level, the output end of this AND circuit also assumes the high level, turning on corresponding one of the bipolar transistors TR and therefore applying electric current via the corresponding pad PO to the corresponding heating element 8. According to the present embodiment, since the circuitry incorporated in the drive IC chips 80 are connected in series, the resulting drive control circuit is capable of driving all of the heating elements 8 selectively.

The data processing circuit 7 is arranged to send the serial-in signal to the sensor IC chips 2 simultaneously with or right after the commencement of strobe signal transmission to the drive IC signals 80. Because of this arrangement, reading operation of the line of document image is performed only during the time in which the strobe signal is being sent from the data processing circuit 7. Arrangement of the heating elements 8 may not necessarily be that all of the heating elements 8 are driven at one time. For example, the arrangement may be that the strobe signal is inputted to a plurality of groups of the heating elements 80 at a certain delay. With such an arrangement as this, the heating elements 8 can be divided into a plurality of groups and driven at a different timing. Even in such a case as this, the light receiving elements 20 are so arranged that the reading of the document image is made only during the period in which one of these strobe signals are being outputted.

As clearly shown in FIG. 1, the platen roller $P_1$ faces the transparent cover 19, and is driven to rotate in the direction indicated by Arrow Nc so as to feed the document D under tight contact with the transparent cover 19 continuously or intermittently in the secondary scanning direction. On the other hand, the platen roller $P_2$ faces the heating elements 8, and is driven to rotate so as to feed the recording paper K between the platen roller itself and the heating elements 8 continuously or intermittently. The rotating direction of the platen roller $P_2$ is the same as of the platen roller $P_1$, and indicated by Arrow Nd. Therefore, the feeding direction of the document D on the transparent cover 19 and the feeding direction of the recording paper k on the heating elements 8 are the same. According to the present embodiment, the feeding angle of the document D on the transparent cover 19 and the feeding angle of the recording paper K on the heating elements 8 are different, and in a strict sense, the feeding directions of the document D and the recording paper k are not identical. However, such a difference in the feeding angle of the document D and the recording paper K as the above is not included in the concept of the sameness in the feeding direction of the document D and the recording paper K. According to the present invention, if the two platen rollers $P_1$, $P_2$ rotate in a same direction, then the document D and the recording paper K respectively fed by these rollers are also fed in the same direction.

Next, function of the image processing apparatus B will be described.

First, since the integrated image-reading/writing head A is capable of both image reading operation and printing operation, image reading of document D and image printing on recording paper K can be performed individually or simultaneously. Both of the platen rollers $P_1$, $P_2$ are disposed above the substrate 4 of the integrated image-reading/writing head A, and the platen roller $P_2$ overlaps the integrated image-reading/writing head A height-wise of the image processing apparatus B. Therefore, the image processing apparatus B can be made thinner than before. The side surface 1a of the case 1 is slanted to be farther away from the platen roller $P_2$. Therefore, space-efficient disposition of the platen roller $P_2$ can be made while making the extension of the edge portion 4a of the substrate 4 relatively small. Therefore, size reduction of the image processing apparatus B can be further prompted.

When the platen rollers $P_1$, $P_2$ are assembled into the box 9, the platen rollers are assembled from above the integrated image-reading/writing head A. Further, the platen rollers $P_1$, $P_2$ press the transparent cover 2 and the heating elements 8 respectively in the same direction. This makes easy the assembling operation of the platen rollers $P_1$, $P_2$.

As shown in FIG. 3, the constitution of the integrated image-reading/writing head A is that each of the light sources 3, the sensor IC chips 2 including the light receiving elements 2, the drive IC chips 80 and the heating elements 8 are mounted on the upper surface 4a of the substrate 4. Further, the wiring patterns related to these components are formed also on the upper surface 4a. Therefore, when forming the wiring patterns and mounting each of these components, there is no need for turning the substrate 4 over. Therefore, productivity can be improved.

According to the integrated image-reading/writing head B, the following operations are performed when copying an image on the document.

Figure 5:
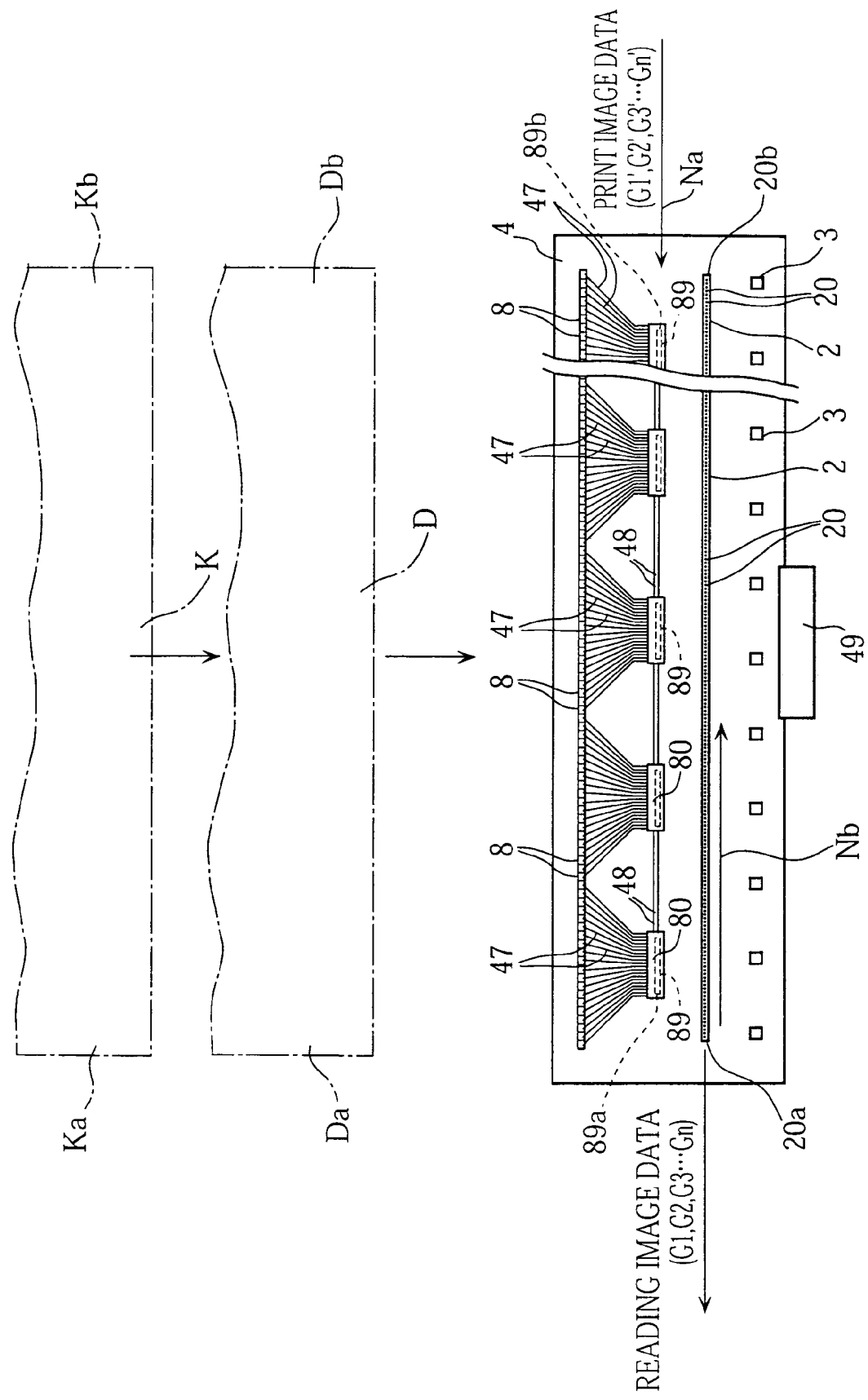
FIG. 5 is a plan view of a principal portion of the integrated image-reading/writing head in FIG. 2.

Specifically, first, reading operation of the image on the document D is performed. As shown in FIG. 5, when the image on the document D is read in the main scanning direction Nb, the read image data for a line outputted from the light receiving elements 20 provides an array of pixel data sequentially read from a left end Da to the right end Db of the document D. More specifically, if individual pixel data of a line read by the light receiving elements 20, from the left-end element 20a to the right-end element 20b, are represented respectively by G1, G2, G3 ~$G_n$, then, as shown in the figure, the read image data of the line includes these pixel data in the order of reading, i.e. in the order of G1, G2, G3 ~$G_n$, and is outputted from the light receiving elements 20 to the data processing circuit 7.

Figure 8:
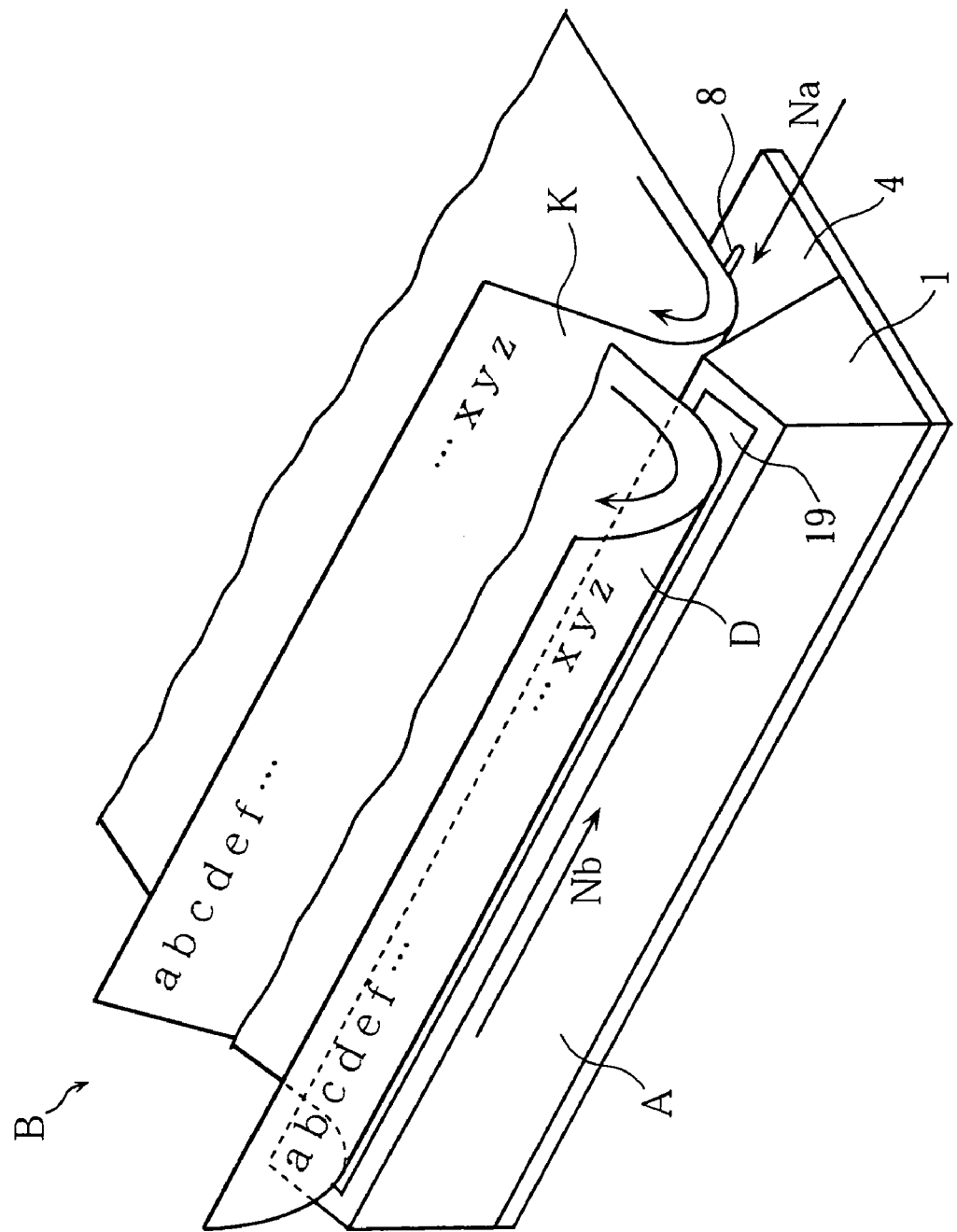
FIG. 8 is a simplified perspective view showing a state of operation of the image processing apparatus in FIG. 1.

The data processing circuit 7, upon receiving the read image data, creates printing image data by converting the image data into binary values representing black or white. The printing image data is then serially sent line by line to the shift registers 89. The printing image data is an image data containing the same number of pixel data G1', G2', G3'~$G'_n$ as the binary conversion of the pixel data G1, G2, G3 ~$G_n$, without changing the order. This printing image data is inputted to the shift registers 89 in the direction indicated by Arrow Na in FIG. 5, i.e. from the right-end shift register 89b. Therefore, within the shift registers 89, the printing data is stored serially from the left-end shift register 89a to the right-end shift register 89b, i.e. in the order of G'1, G'2, G'3 ~$G'_n$, in the main scanning direction Nb. With this arrangement, the heating elements 8 are selectively driven for print output of the printing image data. The printing is made on a downward facing surface of the recording paper K which is being fed in the same direction as in the document D, and the pixel data G'1, G'2, G'3 ~$G'_n$ are printed from a left end Ka to a right end Kb of the recording paper K. As a result, as shown in FIG. 8, the image printed on the recording paper K accurately corresponds to the image on the document D, without becoming a mirror symmetry image of the original image on the document D.

The document copying operation is performed by repeating the above described cycle of processes line by line. However, as has been described earlier, according to the image processing apparatus B, the reading operation by the light receiving elements 20 is performed only during the period in which the strobe signal is being sent to the drive IC chips 80. Therefore, potential inclusion of noise caused by the rising and/or falling of the strobe signal into the image data can be eliminated, and therefore quality of read image data can be improved.

Figure 9:
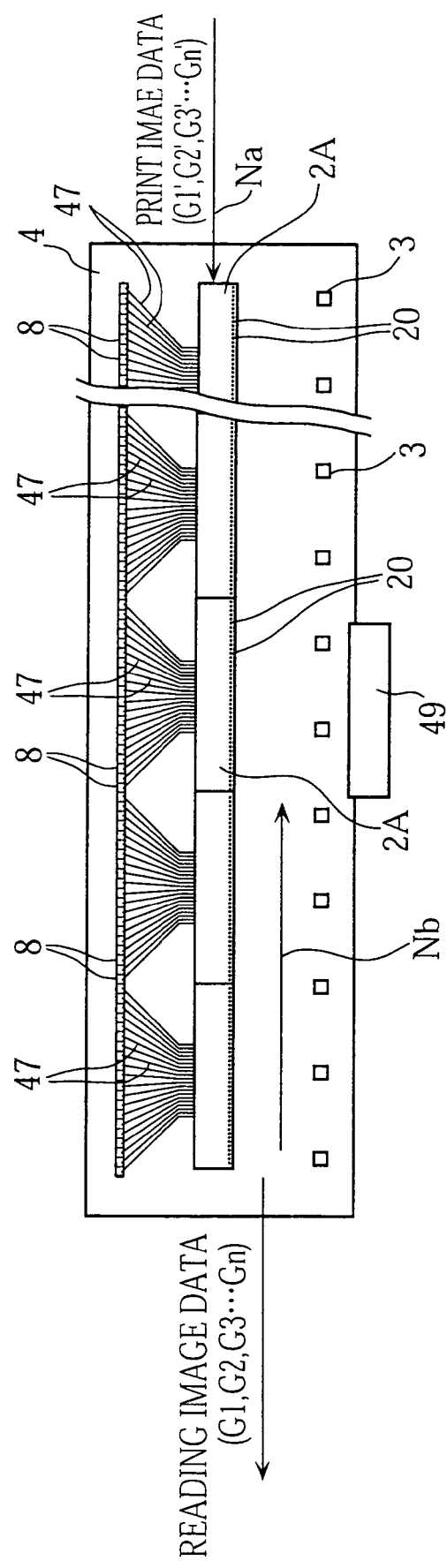
FIG. 9 is a plan view showing a principal portion of a second embodiment of the image processing apparatus according to the present invention.
Figure 10:
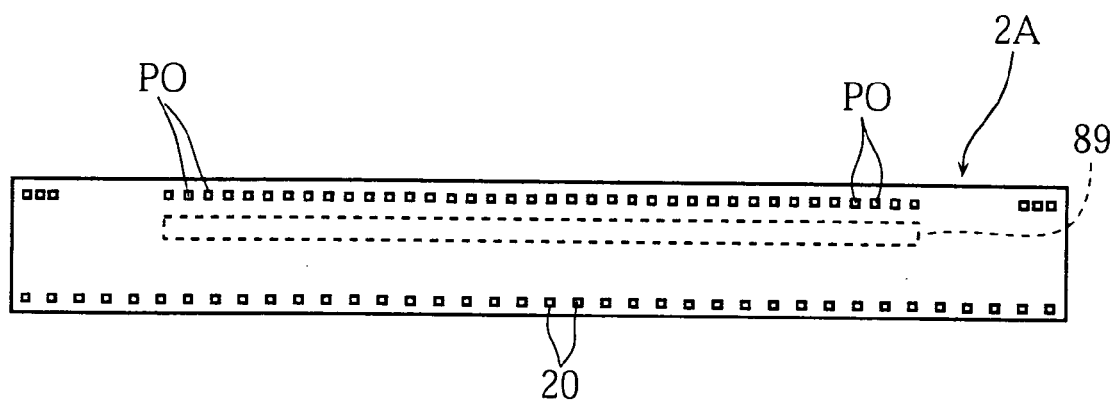
FIG. 10 is a plan view of an IC chip of the image processing apparatus in FIG. 9.

FIG. 9 and FIG. 10 show a second embodiment of the present invention. It should be noted here however, that in FIG. 9 and thereafter, elements same as or similar to those in the first embodiment are indicated by the same alphanumeral codes.

According to the arrangement shown in FIG. 9, a plurality of IC chips 2A are mounted in a row on the upper surface of the substrate 4. In each of the IC chips 2A, the circuit built in the sensor IC chip 2 and the circuit built in the drive IC chip 80 described in the first embodiment are incorporated within a single chip. As clearly shown in FIG. 10, each of the IC chips 2A has an upper surface provided with a plurality of pads PO to connected with the light receiving elements 20 and the heating elements, and other pads for signal input and output. The IC chips 2A are electrically connected in series with each other, thereby constituting a circuit including the necessary number of light receiving elements 20 for reading a line of document and a circuit capable of controlling all of the heating elements 8 for selective driving.

According to the present invention, the image processing apparatus B described in the first embodiment can be constituted by using the IC chips 2A. According to such a constitution as this, the total number of the IC chips mounted on the substrate 4 can be decreased, and the number of steps for mounting the IC chips on the substrate 4 can be decreased. Inputting direction of the printing image data to the IC chips 2A is made the same as in the case shown in FIG. 5, so that the image printed on the recording paper is not inversed in a copy of the document image.

Figure 11:
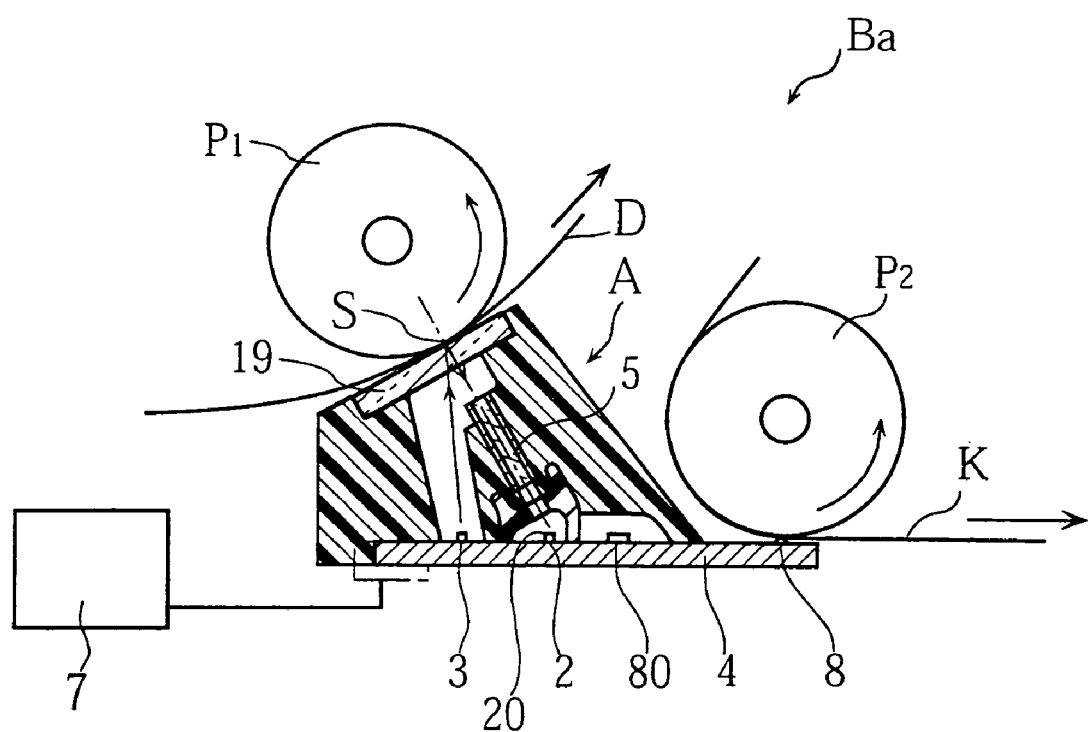
FIG. 11 is a diagram showing a principal portion of a third embodiment of the image processing apparatus according to the present invention.
Figure 12:
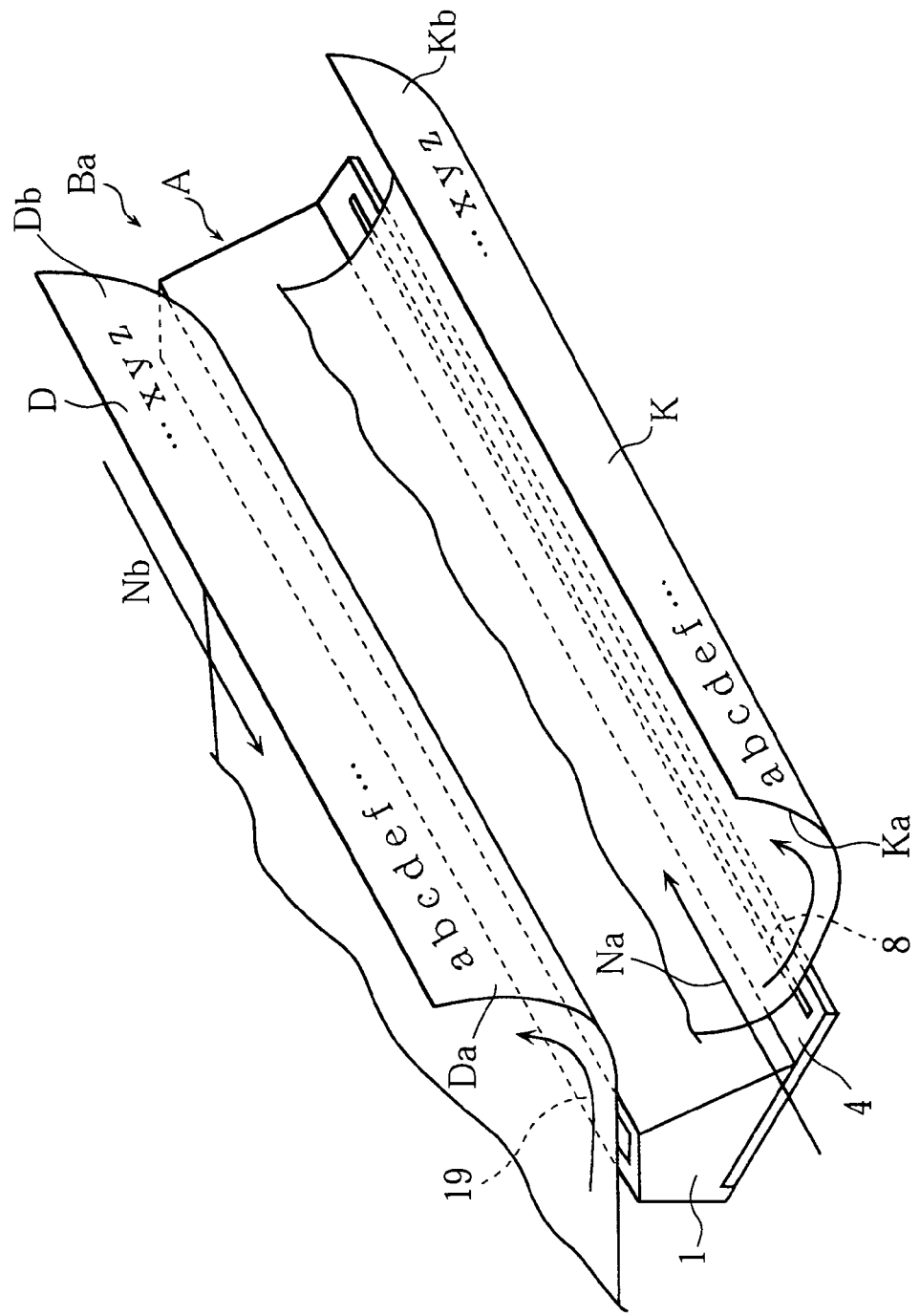
FIG. 12 is a perspective view showing a state of operation of the image processing apparatus in FIG. 11.

FIG. 11 and FIG. 12 show a third embodiment of the present invention.

As clearly shown in FIG. 11, in an image processing apparatus Ba according to the present embodiment, rotating direction of the platen rollers $P_1$, $P_2$ is the opposite to the rotating direction of the platen rollers $P_1$, $P_2$ in the first embodiment. However, even if the rotating direction of the two platen rollers $P_1$, $P_2$ is reversed, the feeding direction of the document D on the transparent cover 12 and the feeding direction of the recording paper K on the heating elements 8 are the same. Therefore, according to the image processing apparatus Ba, as shown in FIG. 12, the image on the document D can be appropriately printed on the recording paper K without mirror inversion if the inputting of the printing image data into the shift registers incorporated in the drive IC chips 80 is in the direction indicated by Arrow Na, which is the opposite direction to the main scanning direction Nb. The main scanning direction Nb is the direction in which the light receiving elements 20 read the image on the document D. Specifically, according to the image processing apparatus Ba, the image on the document D is read from the right end Db to the left end Da of the document whereas the pixel carrying the printing image data corresponding to the right end Db is printed at a right end Kb of the recording paper K. Likewise, the pixel carrying the printing image data corresponding to the left end Da of the document D is printed at a left end Ka of the recording paper K. Therefore, the constitution of the image processing apparatus Ba can be exactly the same as the image processing apparatus B according to the first embodiment, differing from the image processing apparatus B according to the first embodiment only in that the platen rollers $P_1$, $P_2$ rotate in the opposite direction.

FIG. 13 ~FIG. 16 show a fourth embodiment of the present invention.

Figure 13:
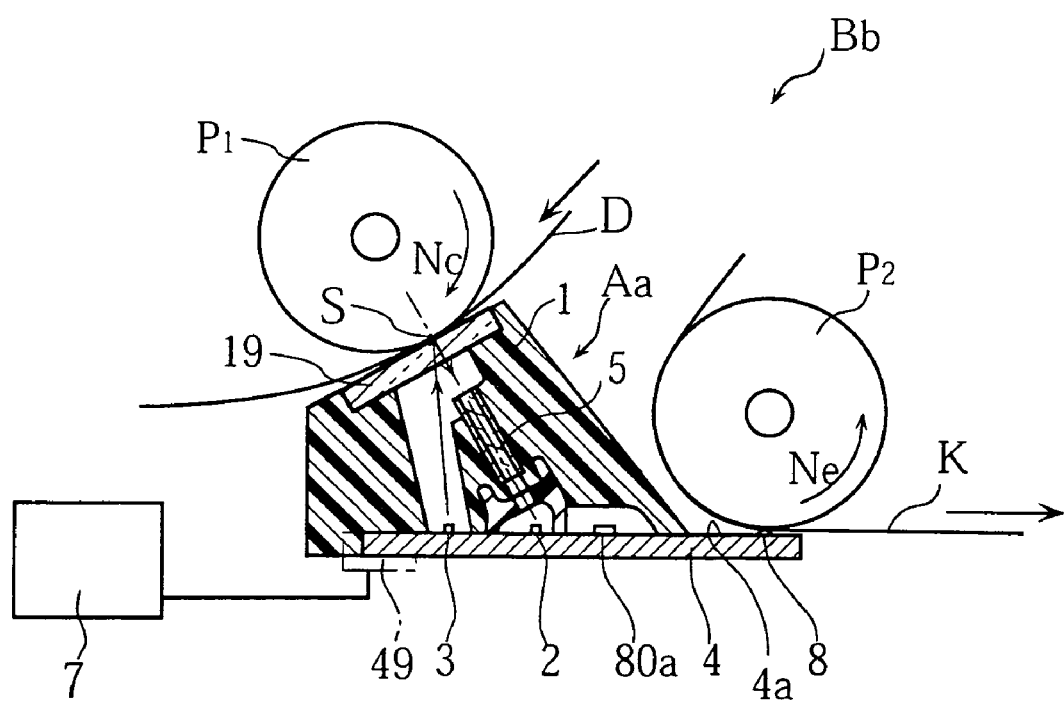
FIG. 13 is a diagram showing a principal portion of a fourth embodiment of the image processing apparatus according to the present invention.
Figure 14:
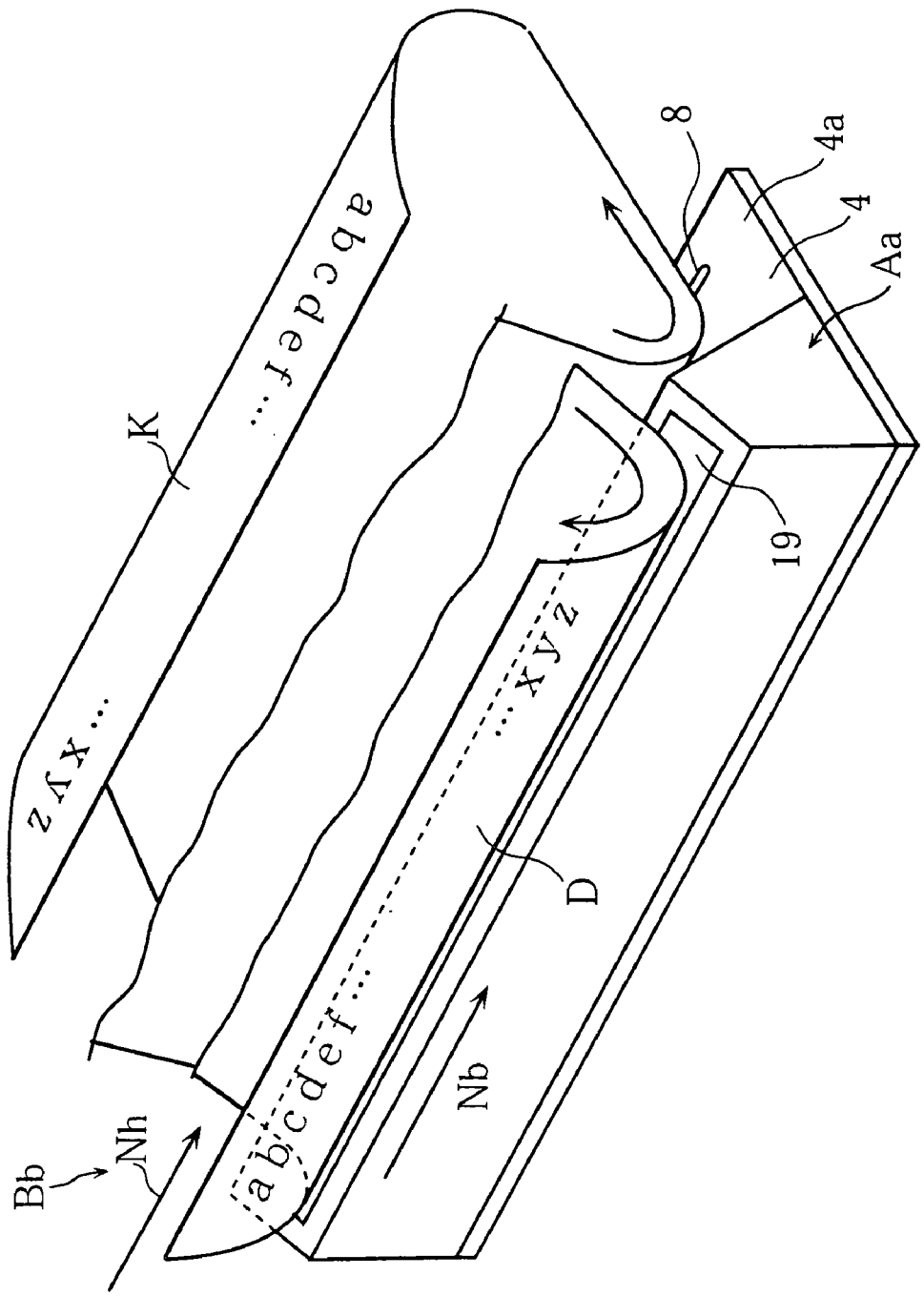
FIG. 14 is a perspective view of a principal portion showing a state of operation of the image processing apparatus in FIG. 13.
Figure 16:
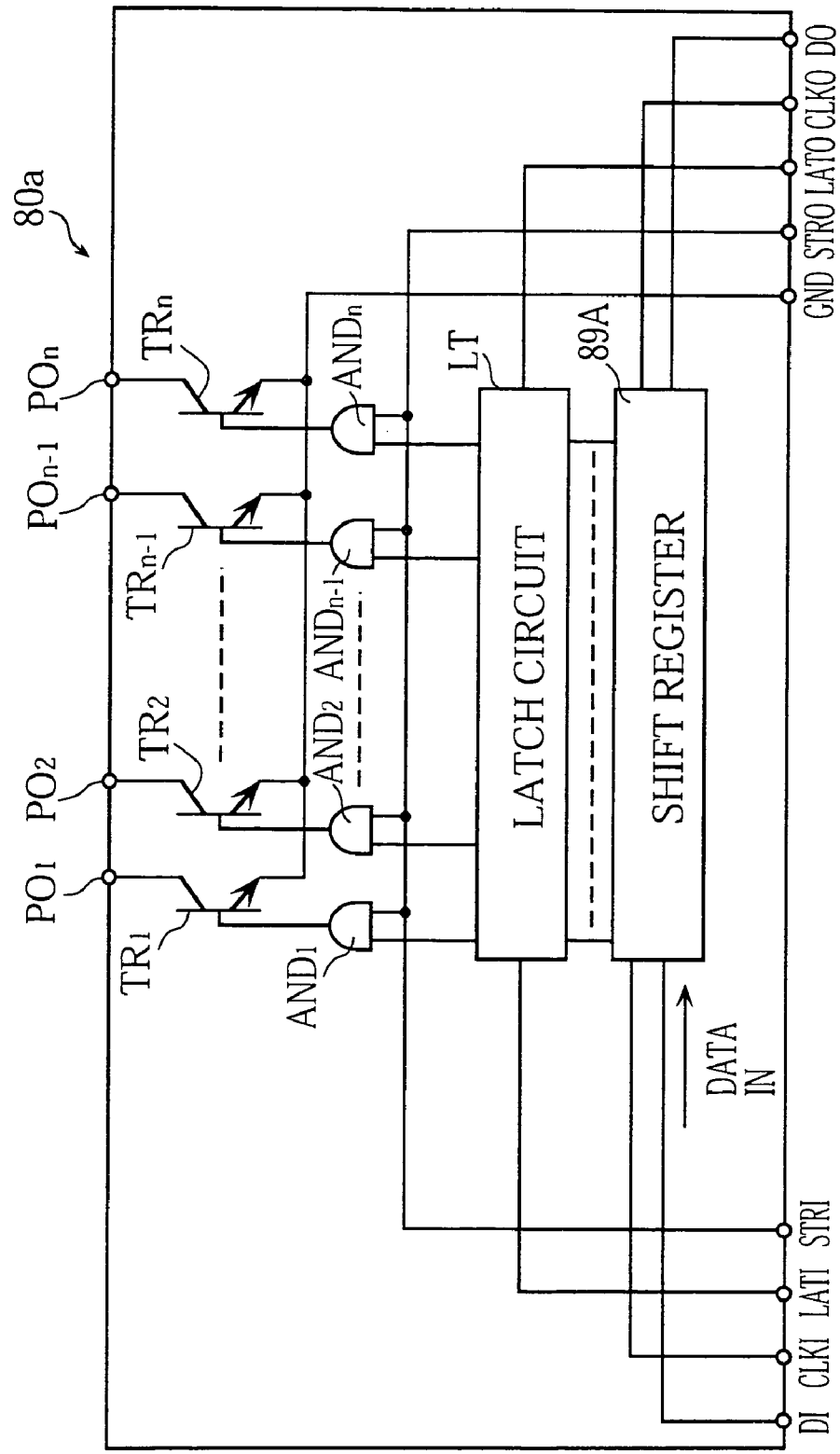
FIG. 16 is a circuit block diagram of an IC chip of the integrated image-reading/writing head used in the image processing apparatus in FIG. 13.

As clearly shown in FIG. 13, in an image processing apparatus Bb according to the present embodiment, the platen roller $P_1$ rotates in the direction indicated by Arrow Nc whereas the platen roller $P_2$ rotates in the opposite direction indicated by Arrow Ne. As a result, the feeding direction of the document D on the transparent cover 12 and the feeding direction of the recording paper K on the heating elements 8 are opposite to each other. As shown in FIG. 16, in each of the drive IC chips 80a used in an integrated image-reading/writing head Aa of this image processing apparatus Bb, disposition pattern of the various pads for inputting and outputting signals and data is a mirror-inversion of the disposition pattern in the drive IC chips 80 shown in FIG. 7. Further, the inputting of the data to shift registers 89A is made from the left end of the array. If the drive IC chips 80a with the above arrangement are used, the wiring pattern formed on the upper surface 4a of the substrate 4 must be altered accordingly. However, the necessary alteration is only that the wiring pattern on the substrate 4 in the image processing apparatus B should be mirror inverted. Therefore, the alteration of the wiring pattern can be performed simply by turning over the pattern forming mask used for the substrate 4.

Figure 15:
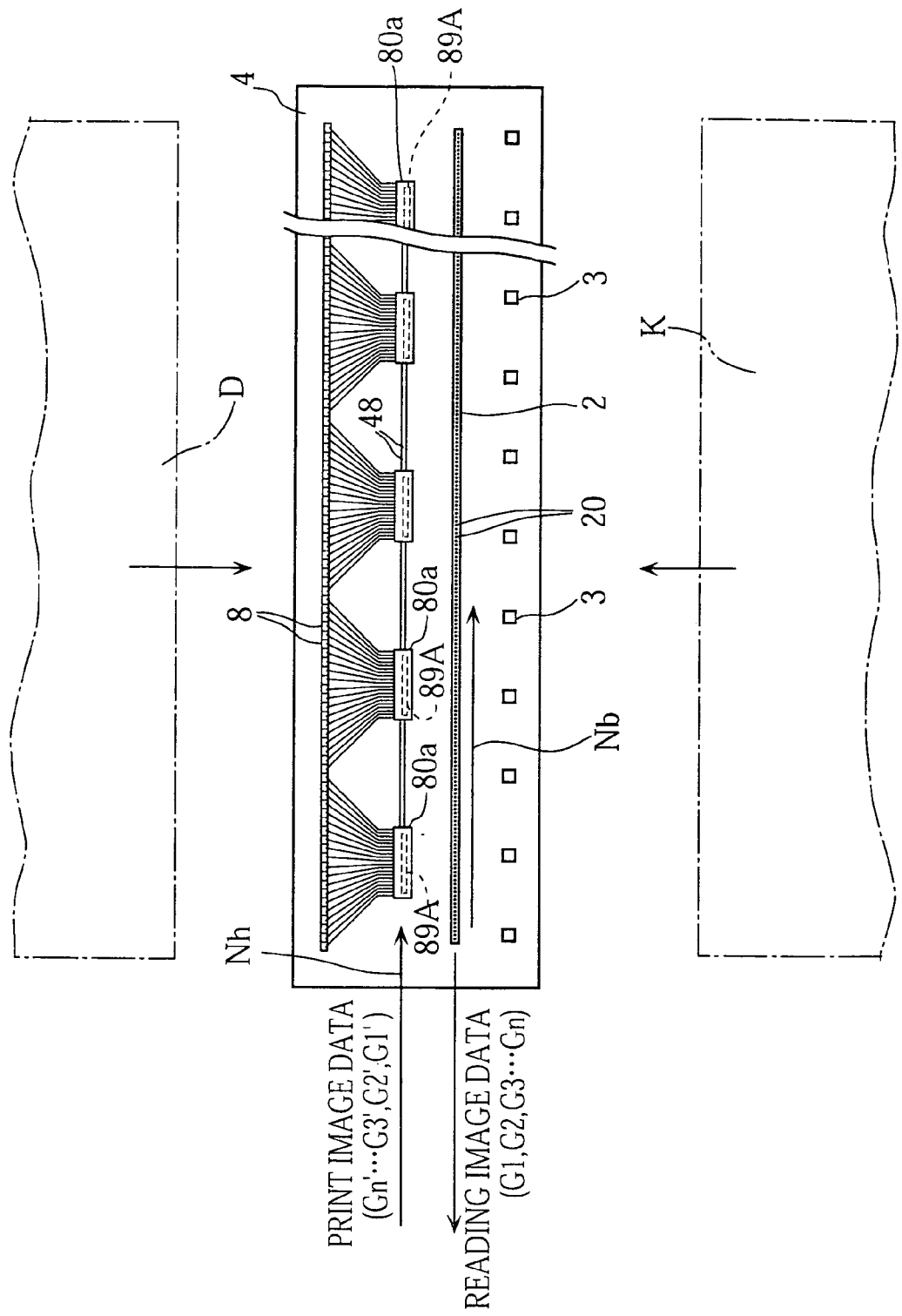
FIG. 15 is a simplified plan view of an integrated image-reading/writing head used in the image processing apparatus in FIG. 13.

According to the image processing apparatus Bb, as shown in FIG. 15, first, the light receiving elements 2 performs reading of the document image in the main scanning direction indicated by Arrow Nb. Then, read image data containing pixel data G1, G2, G3 ~$G_n$ is serially outputted. Then, the data processing circuit 7 creates printing image data containing pixel data G'1, G'2, G'3 ~$G'_n$ as binary conversion of the pixel data G1, G2, G3 ~$G_n$ without changing the order. Then this printing image data is inputted from the left end of the array of shift registers 89A as indicated by Arrow Nh.

According to the image processing apparatus Bb, the pixel data of the printing image data is stored in the order of G'1, G'2, G'3 ~$G'_n$ from the right end to the left end of the array of shift registers 89A, and then outputted on the recording paper K in the same order. Direction of the array in the pixel data G'1, G'2, G'3 ~$G'_n$ of the printing image data printed as the above, is the opposite to the direction of the array in the pixel data G1, G2, G3 ~$G_n$ of the original read image data. However, since the recording paper K and the document D are fed in opposite directions to each other, result is the appropriate printing on the recording paper, without mirror-inverting the original image on the document D.

Figure 17:
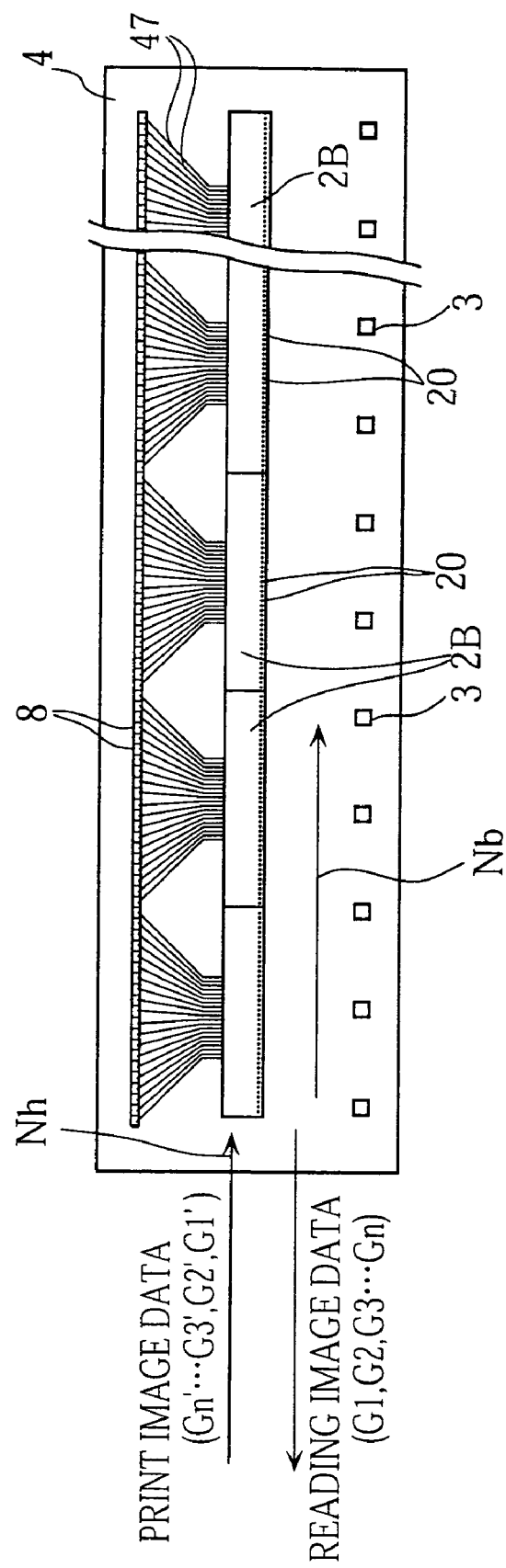
FIG. 17 is a diagram showing a principal portion of a fifth embodiment of the image processing apparatus according to the present invention.

FIG. 17 shows a fifth embodiment of the present invention.

According to the constitution shown in the figure, a plurality of IC chips 2B are mounted in a row on a surface of the substrate 4. Each of the IC chips 2B incorporates, as in the IC chips 2A in the second embodiment, the image reading circuit provided with light receiving elements 20 and the drive control circuit for the heating elements in a single chip. The constitution of the drive control circuit is identical with the constitution shown in FIG. 16.

According to the present invention, the image processing apparatus Bb in the fourth embodiment can be constituted by using the IC chips 2B. According to this constitution, as in the second embodiment, the total number of the IC chips mounted on the substrate 4 can be decreased, and therefore productivity in the manufacture of the integrated image-reading/writing head can be increased. Inputting direction of the printing image data to the IC chips 2B is made the same as in the case shown in FIG. 15, so that the image printed on the recording paper is not an inversed image when a document image is copied.

Figure 18:
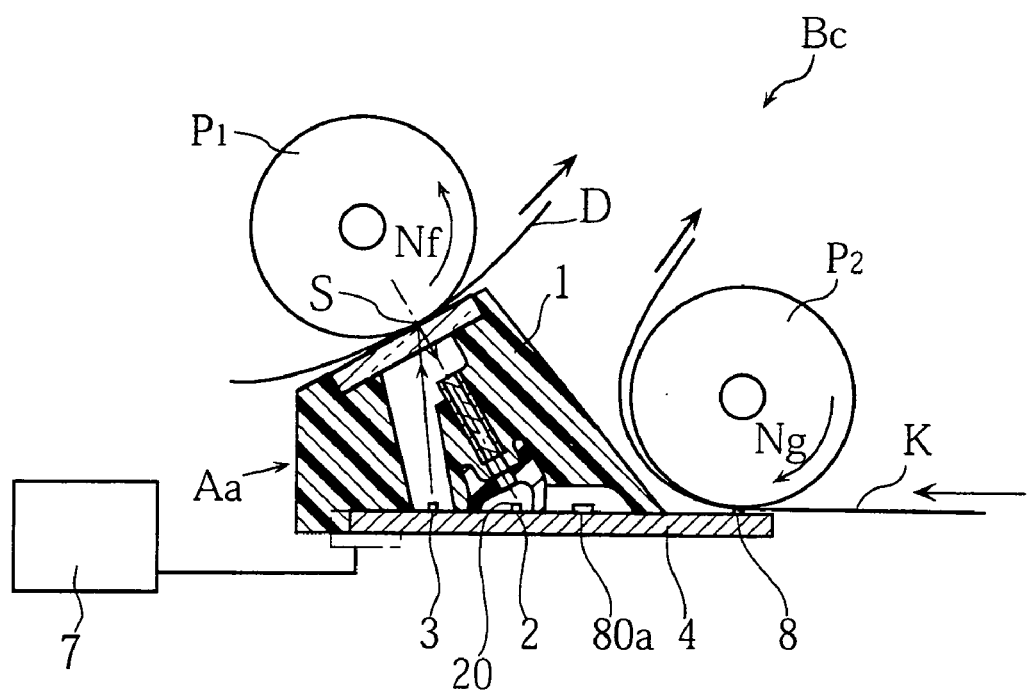
FIG. 18 is a diagram of showing a principal portion of a sixth embodiment of the image processing apparatus according to the present invention.
Figure 19:
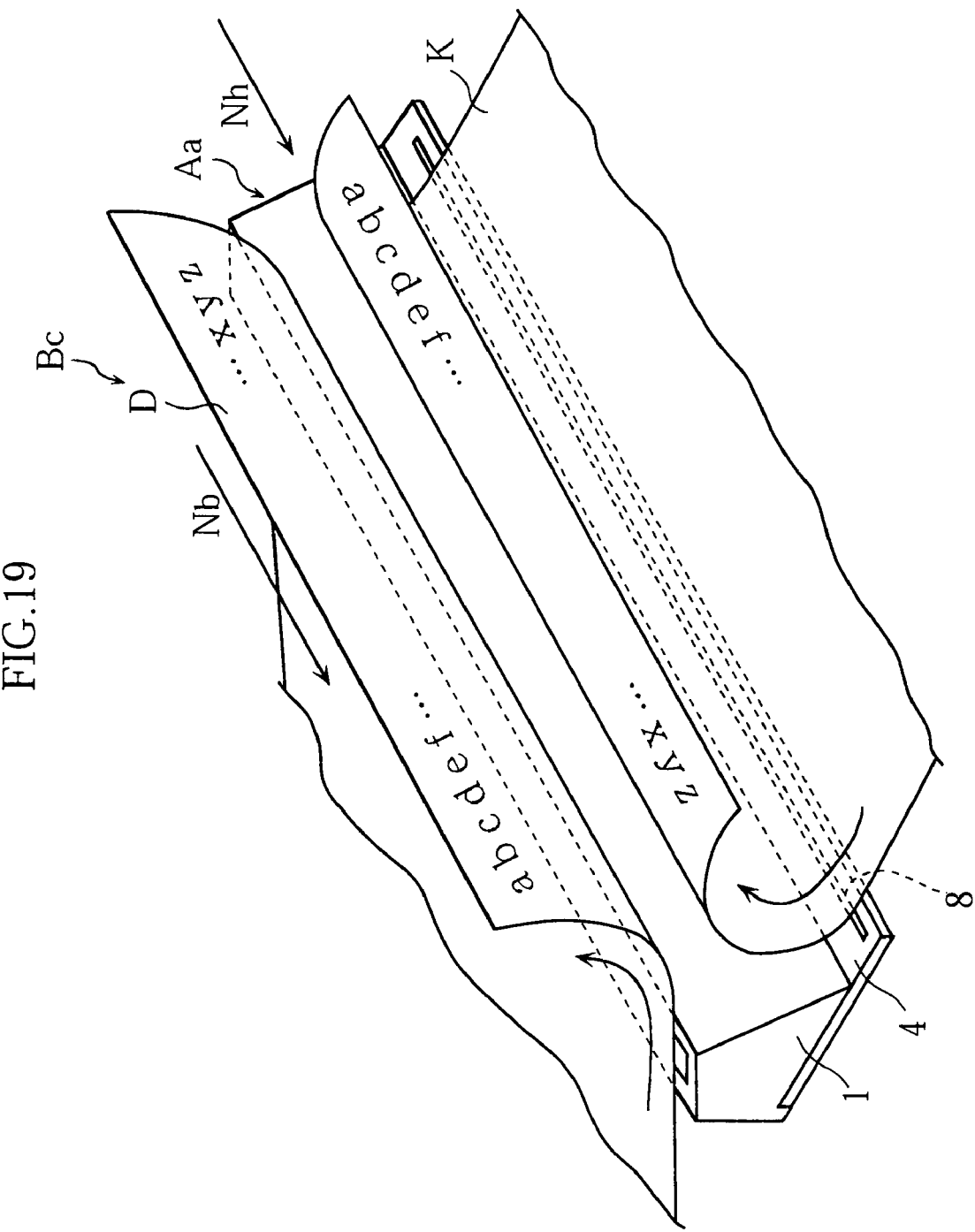
FIG. 19 is a perspective view of a principal portion showing a state of operation of the image processing apparatus in FIG. 18.
Figure 20:
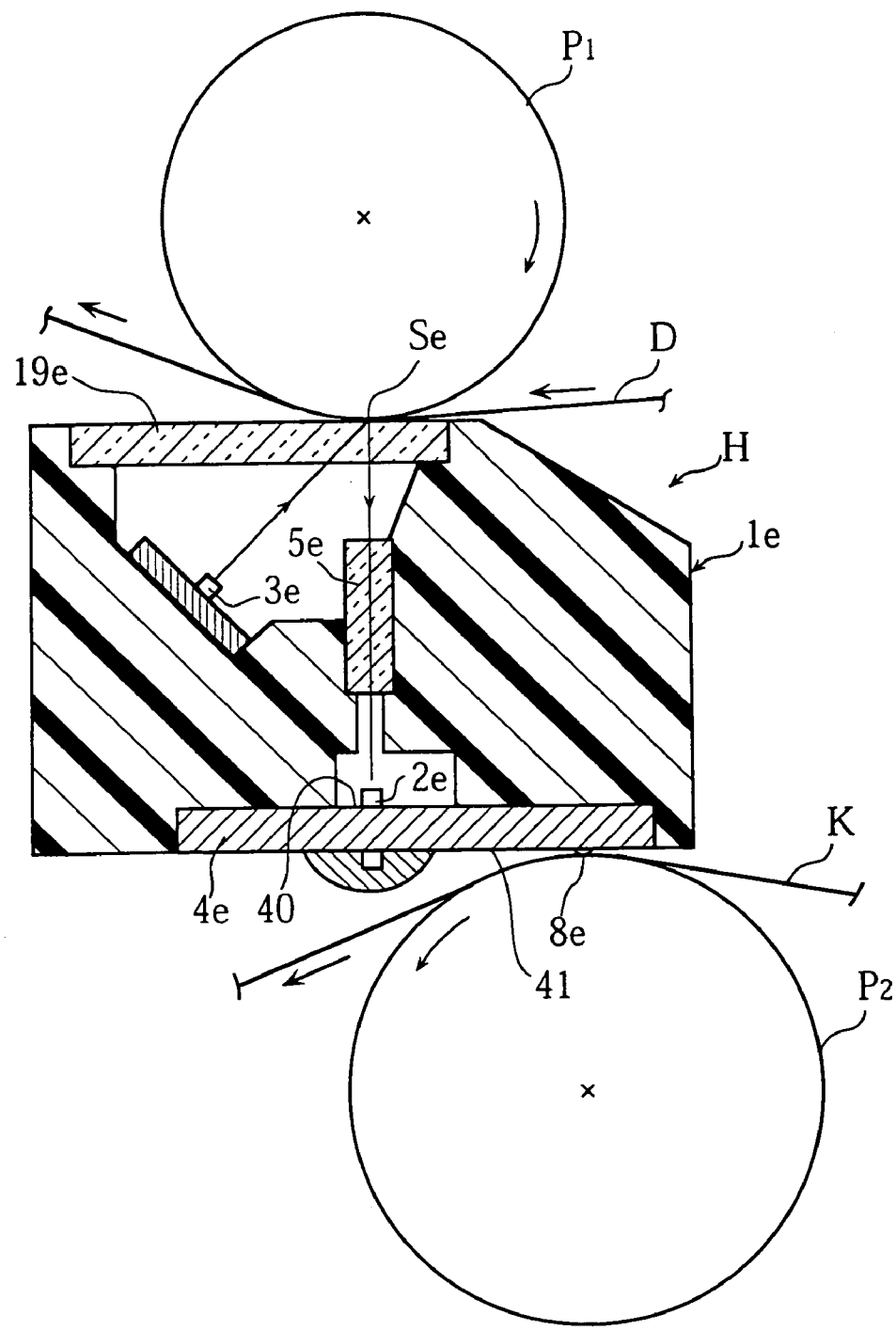
FIG. 20 is a sectional view showing a principal portion of a prior art image processing apparatus.

FIG. 18 and FIG. 19 show a sixth embodiment of the present invention.

As clearly shown in FIG. 18, in an image processing apparatus Bc according to the present embodiment, rotating directions Nf, Ng of the two platen rollers $P_1$, $P_2$ respectively are the opposite to the rotating directions of the platen rollers $P_1$, $P_2$ in the third embodiment. Therefore, again in this image processing apparatus Bc, as in the image processing apparatus Bb, the feeding direction of the document D on the transparent cover 19 and the feeding direction of the recording paper K on the heating elements 8 are opposite to each other. Therefore, according to the image processing apparatus Bc, as shown in FIG. 19, the image on the document D can be appropriately printed on the recording paper K without mirror inversion if the inputting of the printing image data into the shift register incorporated in the drive IC chips 80a is in the direction indicated by Arrow Nh, which is the same direction to the main scanning direction Nb. Therefore, the constitution of the image processing apparatus Bc can be exactly the same as of the image processing apparatus Bb, differing from the image processing apparatus Bb only in that the platen rollers $P_1$, $P_2$ rotate in the opposite directions.

In the above described embodiments, as means for performing appropriate image printing (without mirror inversion), the inputting direction of the printing image data into the shift registers is changed depending on the feeding direction of the document and the recording paper. However, the present invention is not limited to this. According to the present invention, for example, a desired array of the printing image data stored in the shift registers may be achieved by swapping or not swapping the first datum and last datum thereby changing the order of the pixel data when the printing image data created by the data processing circuit is sent line by line.

Specific arrangements in the image processing apparatus according to the present invention are not limited to those described in the embodiment and can be varied in many ways.

What is claimed is:

1. An image processing apparatus comprising:
   an integrated image-reading/writing head including a transparent cover, a substrate opposed to and spaced from the transparent cover, a plurality of light receiving elements mounted in a row on the substrate and capable of reading in a main scanning direction an image on a document faced onto the transparent cover whereby outputting line by line read image data containing a first to an n-th pixel data, and a plurality of printing elements mounted in a row generally in parallel to the light receiving elements on the substrate and capable of outputting printing image data onto a recording paper for printing;
   a platen roller for the document, facing the transparent cover;
   a platen roller for the recording paper, facing the printing elements; and
   data processing means capable of creating the printing image data containing a first to a n-th printing pixel data respectively corresponding to the first to the n-th pixel data in the read image data; characterized by
   that the light receiving elements and the printing elements are mounted on a same surface of the substrate;
   that a feeding direction of the document in a region where the document is faced to the transparent cover and a feeding direction of the recording paper in a region where the recording paper is faced to the printing elements are the same; and
   that the pixel data outputted for the printing are arranged in the order of first to n-th when the printing image data are outputted by the printing elements onto the recording paper for printing.

2. The image processing apparatus according to claim 1, wherein the integrated image-reading/writing head is provided with a drive controlling circuit including a shift register serially storing the pixel data contained in the printing image data received from the data processing means in the order of reception and in the direction of the row of printing elements, and selectively driving the printing elements corresponding to contents of the pixel data stored in the shift register, and
   wherein an inputting direction of the printing image data to the shift register is opposite to the main scanning direction.

3. The image processing apparatus according to claim 2, wherein the drive controlling circuit is constituted by using a plurality of IC chips each incorporating a circuit as a unit of the drive controlling circuit, and
   wherein the IC chips being mounted on the surface of the substrate mounted with the light receiving elements and the printing elements.

4. The image processing apparatus according to claim 2, wherein the drive controlling circuit incorporates a circuit as a unit of the drive controlling circuit, and
   wherein the IC chips also incorporating the light receiving elements.

5. The image processing apparatus according to claim 2, wherein the drive controlling circuit is arranged to perform drive control of the printing elements when receiving a strobe signal from the data processing means, and
   wherein the light receiving elements being arranged to perform reading of the document only while the strobe signal being outputted from the data processing means.

6. The image processing apparatus according to claim 1, wherein the integrated image-reading/writing head is provided with a case fitted with the transparent cover, the case being assembled to the substrate to enclose the light receiving elements, allowing part of the substrate to extend out of the case, and
   wherein the printing elements being mounted on the extended part of the substrate.

7. The image processing apparatus according to claim 1, wherein the surface of the substrate mounted with the light receiving elements and the printing elements is mounted with a light source for illumination of the document.

8. The image processing apparatus according to claim 1, wherein the printing elements are heating elements.

9. An image processing apparatus comprising:
   an integrated image-reading/writing head including a transparent cover, a substrate opposed to and spaced from the transparent cover, a plurality of light receiving elements mounted in a row on the substrate and capable of reading in a main scanning direction an image on a document faced onto the transparent cover whereby outputting line by line read image data containing a first to an n-th pixel data, and a plurality of printing elements mounted in a row generally in parallel to the light receiving elements on the substrate and capable of outputting printing image data onto a recording paper for printing;
   a platen roller for the document, facing the transparent cover;
   a platen roller for the recording paper, facing the printing elements; and
   data processing means capable of creating the printing image data containing a first to a n-th printing pixel data respectively corresponding to the first to the n-th pixel data in the read image data; characterized by
   that the light receiving elements and the printing elements are mounted on a same surface of the substrate;
   that a feeding direction of the document in a region where the document is faced to the transparent cover and a feeding direction of the recording paper in a region where the recording paper is faced to the printing elements are opposite to each other; and
   that the pixel data outputted for the printing are arranged in the order of n-th to first when the printing image data are outputted by the printing elements onto the recording paper for printing.

10. The image processing apparatus according to claim 9, wherein the integrated image-reading/writing head is provided with a drive controlling circuit including a shift register serially storing the pixel data contained in the printing image data received from the data processing means in the order of reception and in the direction of the row of printing elements, and selectively driving the printing elements corresponding to contents of the pixel data stored in the shift register, and wherein an inputting direction of the printing image data to the shift register is the main scanning direction.

11. The image processing apparatus according to claim 10, wherein the drive controlling circuit is constituted by using a plurality of IC chips each incorporating a circuit as a unit of the drive controlling circuit, and wherein the IC chips being mounted on the surface of the substrate mounted with the light receiving elements and the printing elements.

12. The image processing apparatus according to claim 10, wherein the drive controlling circuit incorporates a circuit as a unit of the drive controlling circuit, and wherein the IC chips also incorporating the light receiving elements.

13. The image processing apparatus according to claim 10, wherein the drive controlling circuit is arranged to perform drive control of the printing elements when receiving a strobe signal from the data processing means, and wherein the light receiving elements being arranged to perform reading of the document only while the strobe signal being outputted from the data processing means.

14. The image processing apparatus according to claim 9, wherein the integrated image-reading/writing head is provided with a case fitted with the transparent cover, the case being assembled to the substrate to enclose the light receiving elements, allowing part of the substrate to extend out of the case, and wherein the printing elements being mounted on the extended part of the substrate.

15. The image processing apparatus according to claim 9, wherein the surface of the substrate mounted with the light receiving elements and the printing elements is mounted with a light source for illumination of the document.

16. The image processing apparatus according to claim 9, wherein the printing elements are heating elements.

* * * * *